United States Patent
Kouda et al.

(10) Patent No.: US 8,588,133 B2
(45) Date of Patent: Nov. 19, 2013

(54) MOBILE COMMUNICATION SYSTEM, SIGNAL TRANSMISSION METHOD THEREOF, AND TRANSMITTING NODE

(75) Inventors: Emiko Kouda, Fukuoka (JP); Hiroshi Takubo, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 708 days.

(21) Appl. No.: 12/481,647

(22) Filed: Jun. 10, 2009

(65) Prior Publication Data

US 2010/0067436 A1    Mar. 18, 2010

(30) Foreign Application Priority Data

Sep. 18, 2008    (JP) .................................. 2008-239953

(51) Int. Cl.
H04W 4/00    (2009.01)
(52) U.S. Cl.
USPC ........................................................ 370/328
(58) Field of Classification Search
None
See application file for complete search history.

(56) References Cited

U.S. PATENT DOCUMENTS

2007/0218926 A1* 9/2007 Zhuang et al. ................. 455/466
2008/0102877 A1* 5/2008 Suemitsu et al. .............. 455/522

FOREIGN PATENT DOCUMENTS

| EP | 1 708 439 | 10/2006 |
|---|---|---|
| EP | 1708439 A1 * | 10/2006 |
| EP | 1 876 841 | 1/2008 |
| JP | HEI 05-108509 | 4/1993 |
| JP | HEI 08-223191 | 8/1996 |
| JP | 2000-183968 | 6/2000 |
| JP | 2005-018120 | 1/2005 |
| WO | 01/92992 | 12/2001 |

OTHER PUBLICATIONS

Extended European Search Report issued for corresponding European Patent Application No. 09162345, dated Jun. 27, 2011.
Office Action issued for corresponding Japanese Patent Application No. 2008239953, mailed Aug. 14, 2012, with English translation.

* cited by examiner

*Primary Examiner* — Chi Pham
*Assistant Examiner* — Kouroush Mohebbi
(74) *Attorney, Agent, or Firm* — Myers Wolin, LLC

(57) ABSTRACT

A mobile communication system includes a base station control apparatus, and first and second type base stations having a receiving unit that receives a predetermined signal transmitted from the base station control apparatus. The base station control apparatus includes a type determining unit that determines whether a type of the base station is the second type base station, a transmission period setting unit that sets a transmission period of the predetermined signal for the base station determined to be the second type base stations by the type determining unit, to be longer than a transmission period of the predetermined signal for the base station not determined to be the second type base station, and a transmitting unit that periodically transmits the predetermined signal to the base stations, based on a transmission period set for each of the base stations by the transmission period setting unit.

11 Claims, 23 Drawing Sheets

| BASE STATION NAME | BASE STATION NUMBER | TYPE | TRANSMISSION INTERVAL VALUE |
|---|---|---|---|
| FEMTO #1 | XXX_1 | SMALL BASE STATION | 5 |
| FEMTO #2 | XXX_2 | SMALL BASE STATION | 3 |
| MACRO #1 | YYY_1 | LARGE BASE STATION | 1 |
| FEMTO #3 | XXX_3 | SMALL BASE STATION | 2 |

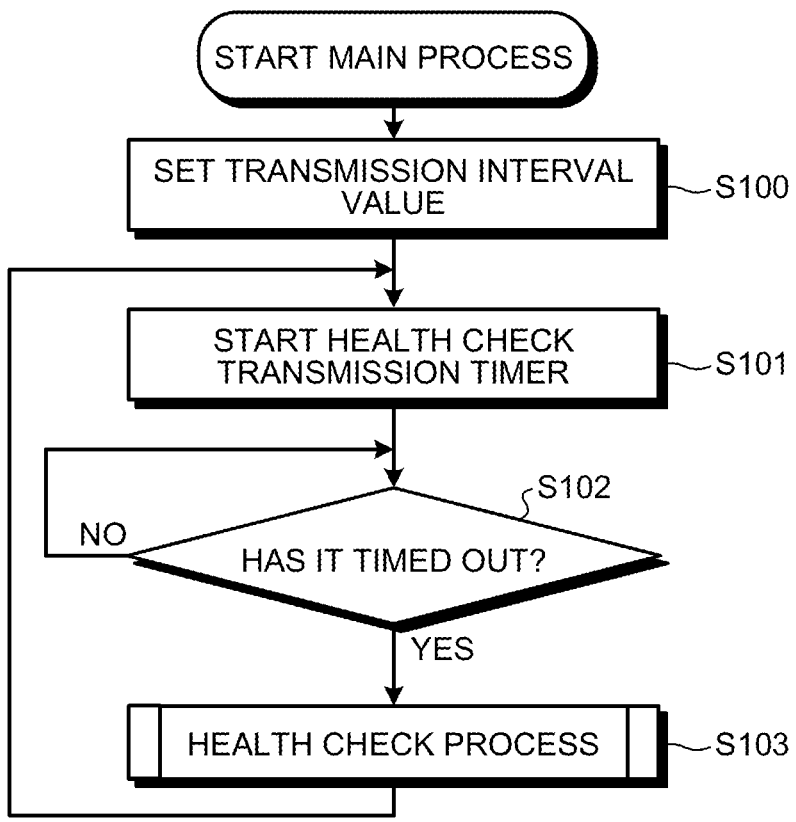

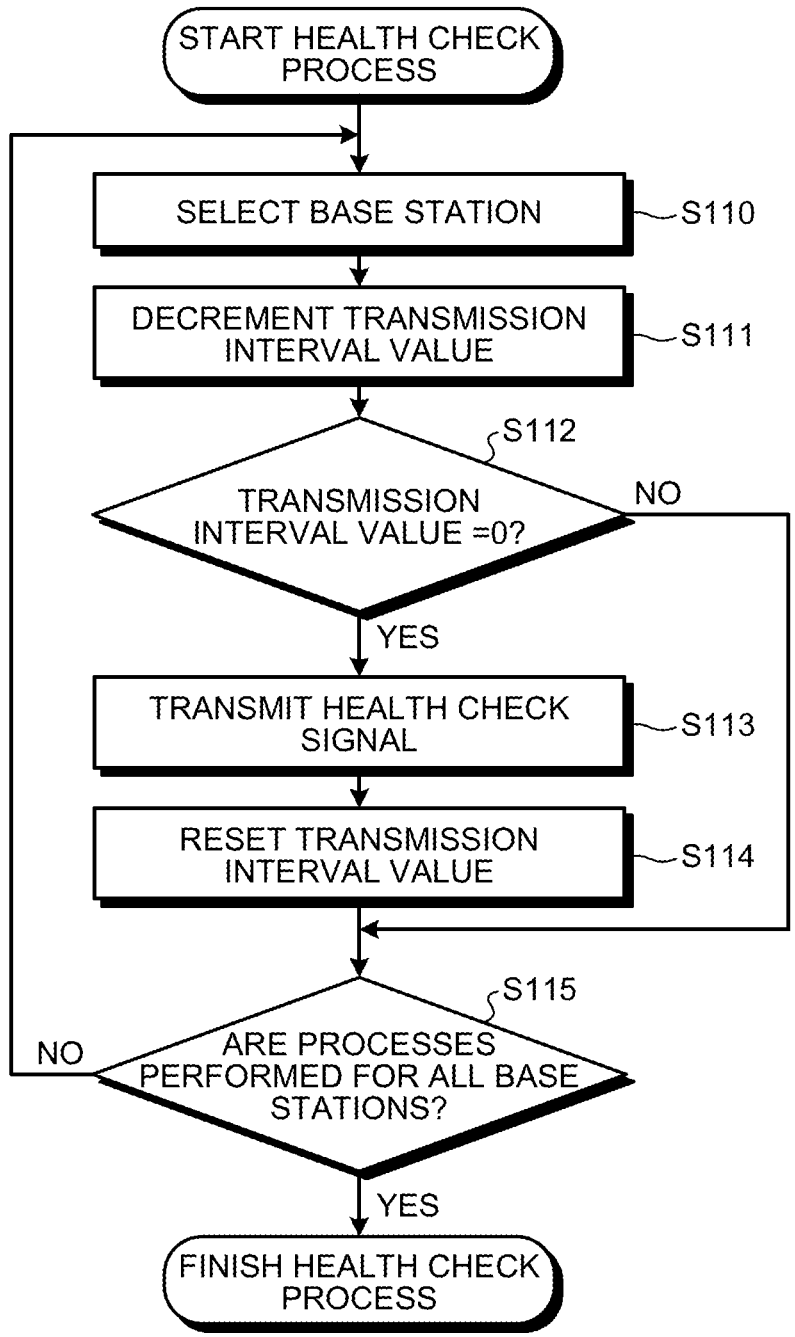

FIG.9

| BASE STATION NAME | BASE STATION NUMBER | TYPE | LOCATED NUMBER |
|---|---|---|---|
| FEMTO #1 | XXX_1 | SMALL BASE STATION | 1 |
| FEMTO #2 | XXX_2 | SMALL BASE STATION | 0 |
| MACRO #1 | YYY_1 | LARGE BASE STATION | 300 |
| FEMTO #3 | XXX_3 | SMALL BASE STATION | 4 |

FIG.18

| BASE STATION NUMBER | IDENTIFIER OF MOBILE TERMINAL | LOCATED STATE |
|---|---|---|
| XXX_1 | WWW | NOT LOCATED |
| | XXX | LOCATED |
| | YYY | NOT LOCATED |
| | ZZZ | NOT LOCATED |
| | ⋮ | ⋮ |
| XXX_2 | AAA | NOT LOCATED |
| | BBB | NOT LOCATED |
| | CCC | NOT LOCATED |
| | ⋮ | ⋮ |
| ⋮ | ⋮ | ⋮ |

MOBILE COMMUNICATION SYSTEM, SIGNAL TRANSMISSION METHOD THEREOF, AND TRANSMITTING NODE

CROSS-REFERENCE TO RELATED APPLICATION

This application is based upon and claims the benefit of priority of the prior Japanese Patent Application No. 2008-239953, filed on Sep. 18, 2008, the entire contents of which are incorporated herein by reference.

FIELD

The embodiments discussed herein are directed to a mobile communication system, a signal transmission method thereof, and a transmitting node.

BACKGROUND

In mobile communication systems including a plurality of base stations, predetermined signals such as a health check signal and a paging signal have been periodically transmitted to the base stations. Conventional technologies are disclosed in, for example, Japanese Laid-open Patent Publication No. H5-108509 and Japanese Laid-open Patent Publication No. H8-223191. The health check signal is a signal to check an operation state of the base stations, and the paging signal is a signal to detect a mobile terminal to be connected.

As a base station that forms such a mobile communication system, a small base station that covers a smaller range (a few meters to a few tens of meters) than that of an existing base station has been developed. The small base station, for example, has been developed to provide a good quality service even in places where radio waves are hard to reach, such as indoors and underground.

The small base station covers a range much smaller than that of the existing base station (hereinafter, referred to as "large base station"), and because an individual cell is small, a large number of small base stations can be installed in a network.

Accordingly, when the small base stations are installed, a significantly large number of base stations may be present in the mobile communication system, compared with that of the existing system. If the significantly large number of base stations is present in the mobile communication system in this manner, a large load is applied to a transmitting node that transmits a predetermined signal to each base station. Accordingly, provision of various services may be adversely affected.

SUMMARY

According to an aspect of an embodiment of the present invention, a mobile communication system includes a plurality of base stations grouped in either a first type base station or a second type base station and a transmitting node connected to the base stations via a network. Each of the base stations includes a receiving unit that receives a predetermined signal transmitted from the transmitting node. The transmitting node includes a type determining unit that determines whether a type of the base station is the second type base station; a transmission period setting unit that sets a transmission period of the predetermined signal for the base station determined to be the second type base station by the type determining unit, to be longer than a transmission period of the predetermined signal for the base station not determined to be the second type base station; and a transmitting unit that transmits the predetermined signal to the base stations, based on a transmission period set for each of the base stations by the transmission period setting unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a schematic of an example of a transmission interval setting table;

FIG. 6 is a flowchart of a procedure of a main process related to a health check transmission performed by the base station control apparatus according to the first embodiment;

FIG. 7 is a flowchart of a procedure of a health check process according to the first embodiment;

FIG. 9 is a schematic of an example of a located information table;

FIG. 18 is a schematic of an example of a locatable terminal table;

DESCRIPTION OF EMBODIMENTS

First to fifth exemplary embodiments of a mobile communication system, a signal transmission method thereof, and a transmitting node are described below with reference to the accompanying drawings. In the embodiments below, an example when the transmitting node according to the present invention is employed in a base station control apparatus that manages and controls information on base stations is described.

The transmitting node is not only limited to the base station control apparatus, but for example, other main network node that forms a core network may have its function, or a dedicated apparatus may be provided in the core network.

Figure 1:
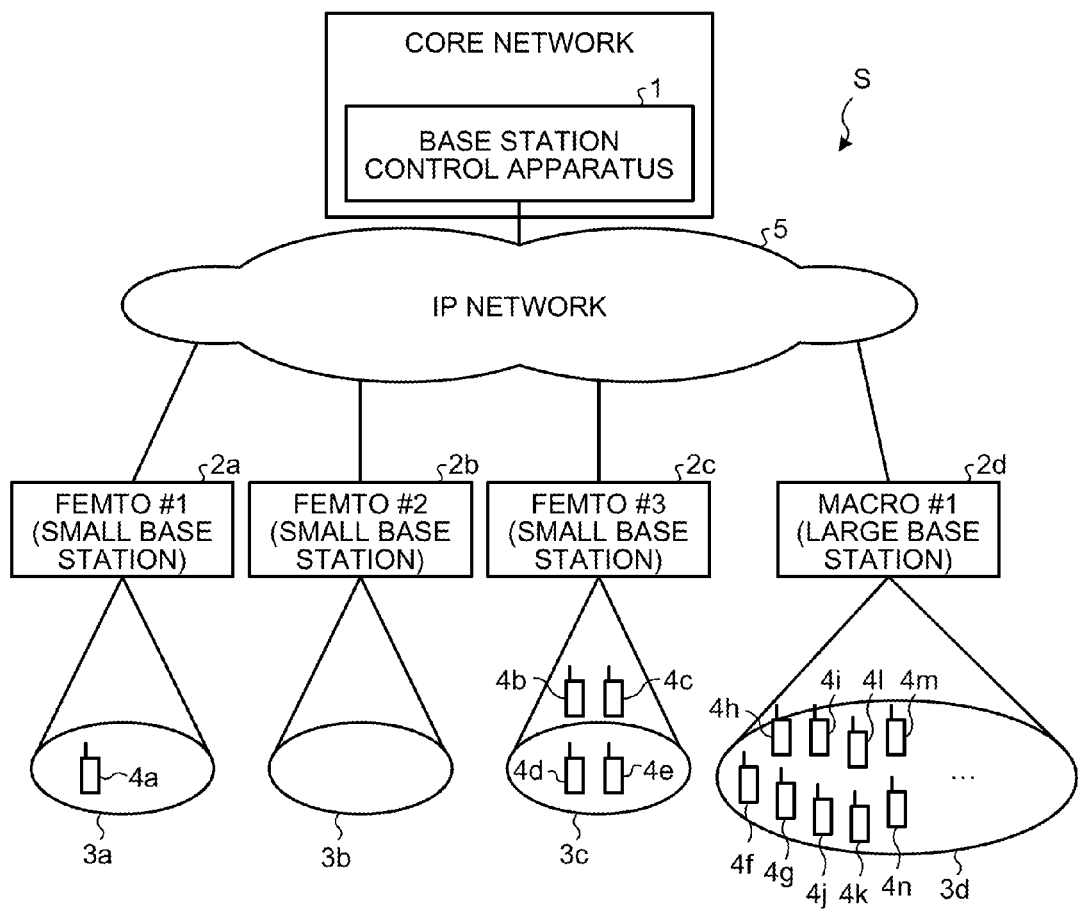
FIG. 1 is a schematic of an entire configuration of a mobile communication system according to a first embodiment.
Figure 2:
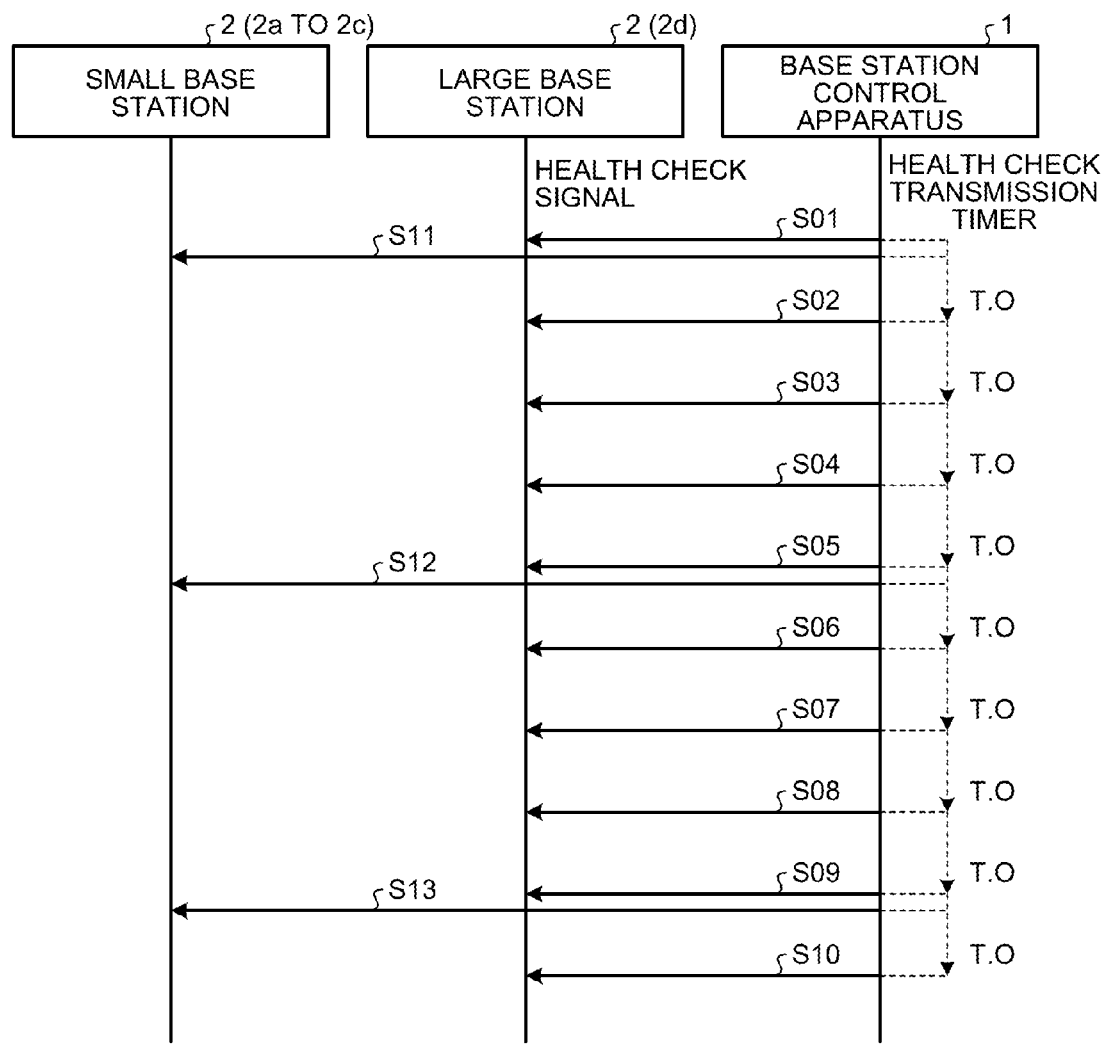
FIG. 2 is a schematic of a transmission method of a health check signal according to the first embodiment.

An outline of a mobile communication system according to a first embodiment will now be described with reference to FIGS. 1 and 2. FIG. 1 is a schematic of an entire configuration of the mobile communication system according to the present embodiment. FIG. 2 is a schematic of a transmission method of a health check signal of the mobile communication system.

As depicted in FIG. 1, a mobile communication system S according to the present embodiment includes a plurality of mobile terminals 4a to 4n, a plurality of base stations 2a to 2d, and a base station control apparatus 1 connected to the base stations 2a to 2d via an internet protocol (IP) network 5 that is a network.

The base stations 2a to 2d are apparatuses that perform wireless communication with the mobile terminals 4a to 4n. In the present embodiment, the base stations 2a to 2d are classified into either type: a small base station or a large base station. The large base station here is a first type base station and indicates relatively large equipment installed on a telephone pole, a rooftop of a building, a telephone booth, and the like. More specifically, as depicted in FIG. 1, the base station 2d corresponds to the large base station, and forms a macro cell 3d that covers a relatively large range of radius from one kilometer to a few kilometers.

The small base station is a second type base station and is a small base station installed in places where radio waves are relatively hard to reach, such as indoors and underground. More specifically, as depicted in FIG. 1, the base stations 2a to 2c correspond to the small base station, and form femto cells 3a to 3c that cover a few meters to a few tens of meters that are smaller than the macro cell covered by the large base station.

The base stations 2a to 2d perform wireless communication with the mobile terminals 4a to 4n located in the cells 3a to 3d unique to the base stations 2. A "mobile terminal located in a cell of a base station" indicates that a mobile terminal is located in a cell of the base station and is ready to receive service. In other words, even if a mobile terminal is present in the cell of the base station, a mobile terminal whose power is turned off or a mobile terminal not subscribing to the service provided by the mobile communication system S according to the present embodiment, are not included in the "mobile terminal located in a cell of a base station".

In the present embodiment, as depicted in FIG. 1, the mobile terminal 4a is located in the cell 3a of the base station 2a, the mobile terminals 4b to 4e are located in the cell 3c of the base station 2c, and the mobile terminals 4f to 4n are located in the cell 3d of the base station 2d. No mobile terminal 4 is located in the cell 3b of the base station 2b.

The base station control apparatus 1 functions as a transmitting node, and is one of the main network nodes that form the core network of the mobile communication system S. In the present embodiment, the base station control apparatus 1 is a serving general packet radio service support node (SGSN) that includes a gateway function, an integration processing function of a packet transmitted or received by the mobile terminal 4, and the like.

As other main network nodes, in addition to the SGSN, for example, the core network includes a home location register (HLR) that stores therein subscriber information (such as telephone number and subscription service), a gateway general packet radio service (GPRS) support node (GGSN) that transmits, for example, the paging signal to the base stations, a cell broadcast center (CBC) that transmits, for example, a write-replace signal to the base stations.

In the mobile communication system S according to the present embodiment, a health check signal that checks the operating condition of the base stations 2a to 2d is periodically transmitted to the base stations 2a to 2d from the base station control apparatus 1, via the IP network 5.

More specifically, the base station control apparatus 1, as depicted in FIG. 2, includes a health check transmission timer that is a timer to determine a transmission timing of a health check signal. The base station control apparatus 1 transmits the health check signal to the base stations, depending on the number of times the health check signal transmission timer has timed out.

The base station control apparatus 1 transmits a health check signal to the base station 2d grouped into the large base station, every time the health check transmission timer times out (Steps S01 to S10). The base station control apparatus 1 transmits health check signals to the base stations 2a to 2c grouped into the small base station, every five times the health check transmission timer times out (Steps S11 to S13).

In this manner, in the mobile communication system S according to the present embodiment, a transmission period of the health check signal for the small base station is longer than a transmission period of the health check signal for the large base station (in other words, the health check signal is transmitted the less number of times during a certain period of time). Accordingly, even if the small base stations are installed and the number of base stations in a network is increased, it is possible to prevent a transmitting node that transmits predetermined signals to a plurality of base stations from carrying a large transmission load.

A cell formed by the small base station is individually small, and the number of the mobile terminal 4 locatable in the cell of one small base station is small. Accordingly, no mobile terminal 4 is often located in the cell. Because the cell is generally included in a cell formed by the large base station, even if the small base station goes down by any chance, the large base station can often cover the small base station. Therefore, as in the present embodiment, even if the transmission period of the health check signal for the small base station, among the small base station and the large base station, is made longer, a degradation of service quality and the like seldom occurs.

A specific configuration of the base station control apparatus 1 depicted in FIG. 1 will now be described with reference to FIGS. 3 to 5.

Figures 3, 4:
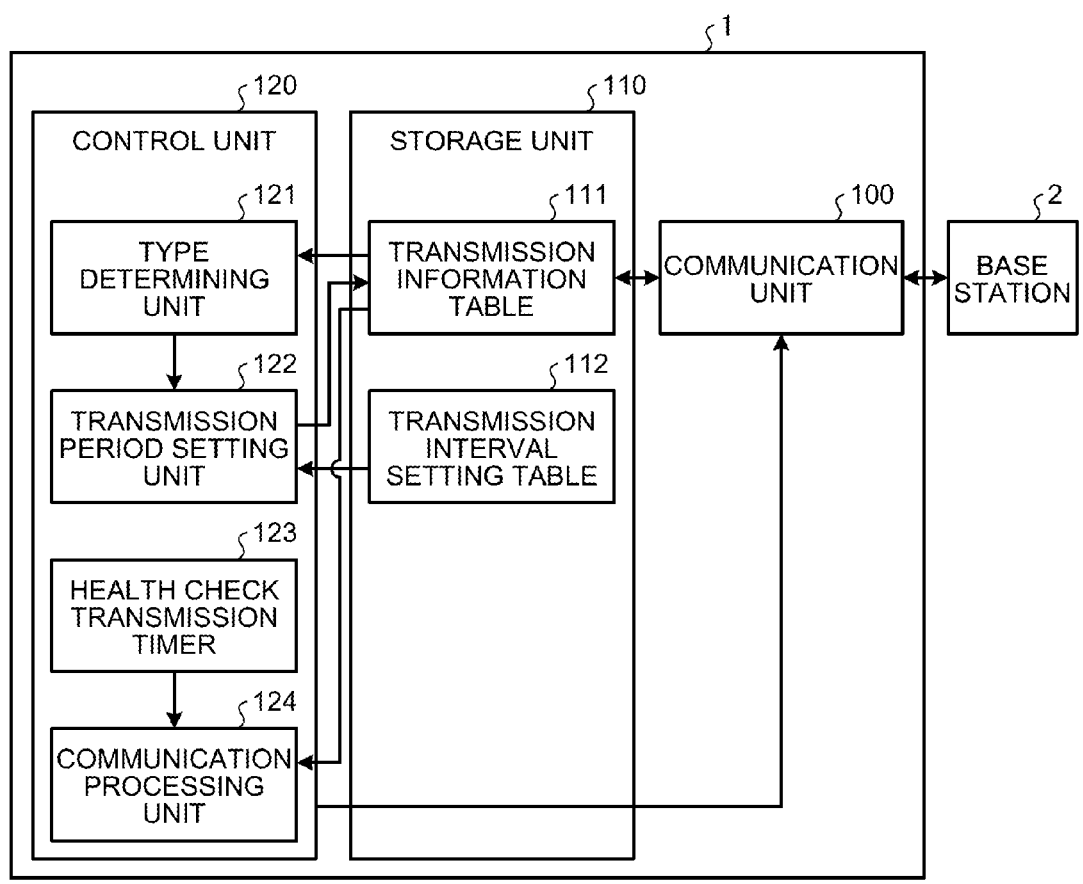
FIG. 3 is a block diagram of a configuration of a base station control apparatus according to the first embodiment.
FIG. 4 is a schematic of an example of a transmission information table.

FIG. 3 is a block diagram of a configuration of the base station control apparatus 1 according to the present embodiment. FIG. 4 is a schematic of an example of a transmission information table stored in the base station control apparatus 1 according to the present embodiment. FIG. 5 is a schematic of an example of a transmission interval setting table stored in the base station control apparatus 1 according to the present embodiment. For components not related to the health check transmission method according to the present embodiment, the illustration and description thereof are omitted.

As depicted in FIG. 3, the base station control apparatus 1 according to the present embodiment includes a communication unit 100, a storage unit 110, and a control unit 120.

The communication unit 100 is a network interface that transmits various signals with a base station 2 via the IP network 5.

The storage unit 110 stores therein data and computer programs required for various types of processing performed by the control unit 120, and as those most closely related to the present embodiment, stores therein a transmission information table 111 and a transmission interval setting table 112.

The transmission information table 111, as depicted in FIG. 4, stores therein a base station number, a type of the base station 2, and a transmission interval value in correlation with a base station name. The base station number is a unique number assigned for each base station, and the type of base station is information that indicates whether the base station is a small base station or a large base station.

The transmission interval value is a value that indicates how many more times the health check transmission timer should time out before transmitting a health check signal. In other words, the base station control apparatus 1, as depicted in FIG. 4, transmits a health check signal to a "femto #2", when the health check transmission timer times out three more times.

The transmission interval setting table 112, as depicted in FIG. 5, stores therein a transmission interval setting value of a health check signal in correlation with the type of the base station 2. The transmission interval setting value is an initial value of the transmission interval value for each type of the base station 2.

The control unit 120 controls the entire base station control apparatus 1, and executes various types of processes. As those most closely related to the present embodiment, the control unit 120 includes a type determining unit 121, a transmission period setting unit 122, a health check transmission timer 123, and a communication processing unit 124.

The type determining unit 121 functions as a type determining unit, and determines whether the type of the base station is a small base station, by referring to the transmission information table 111 stored in the storage unit 110.

The transmission period setting unit 122 sets a transmission period of a health check signal transmitted to the base station 2 determined as a small base station to be longer than a transmission period of a health check signal transmitted to a base station not determined as a small base station. The transmission period setting unit 122 functions as a transmission period setting unit.

More specifically, the transmission period setting unit 122 sets a transmission interval value "1" for the base station 2d whose type is a large base station, by referring to the transmission information table 111 and the transmission interval setting table 112 stored in the storage unit 110. The transmission period setting unit 122 sets a transmission interval value "5" for the base stations 2a to 2c whose types are small base stations.

The communication processing unit 124 functions as a transmitting unit with the communication unit 100, and periodically transmits health check signals to the base stations 2a to 2d, based on the transmission period set for each base station 2 by the transmission period setting unit 122.

More specifically, the communication processing unit 124, when the transmission interval value stored in the transmission information table 111 is decremented to "0", depending on the number of times the health check transmission timer 123 has timed out, transmits a health check signal to the base station 2 corresponding to the transmission interval value.

For example, the base station control apparatus 1 transmits a health check signal to the base station 2d whose type is a large base station, every time the health check transmission timer 123 times out. The base station control apparatus 1 transmits a health check signal to the base stations 2a to 2c whose types are small base stations, every five times the health check transmission timer 123 times out.

The base stations 2a to 2d according to the present embodiment can employ a general small base station or a large base station, and include a receiver formed of a network interface and the like. The receiver functions as a receiving unit, and receives a health check signal and other information transmitted from the base station control apparatus 1.

The mobile terminals 4a to 4n according to the present embodiment are apparatus that can communicate with a communication apparatus at the other end by performing wireless communication with the base station. The mobile terminals 4a to 4n, for example, correspond to a mobile phone, a personal handyphone system (PHS), a personal digital assistant (PDA), a mobile personal computer including a communication function, and the like.

An example of a specific operation performed by the base station control apparatus 1 according to the present embodiment will now be described with reference to FIGS. 6 and 7. FIG. 6 is a flowchart of a procedure of a main process related to a transmission of a health check signal performed by the base station control apparatus 1 according to the present embodiment. The following process is executed when the base station control apparatus 1 functions as the units described above.

As depicted in FIG. 6, when the main process related to a health check process is started, the transmission period setting unit 122 of the base station control apparatus 1 sets a transmission interval value (Step S100). In other words, the control unit 120 sets a transmission interval value for each base station 2 stored in the transmission information table 111, by referring to the transmission interval setting table 112 and the transmission information table 111.

When the process at Step S100 is finished, the control unit 120 starts the health check transmission timer 123 (Step S101). The control unit 120 then determines whether the health check transmission timer 123 has timed out (Step S102). In the process, if it is determined that the health check transmission timer 123 has timed out (Yes at Step S102), the control unit 120 proceeds to the health check process at Step S103. The health check process is a series of processes at Steps S110 to S115 in FIG. 7, which will be described later.

When the process at Step S103 is finished, the control unit 120 proceeds to Step S101, and activates the health check transmission timer again.

Subsequently, the health check process at Step S103 will now be described with reference to FIG. 7. FIG. 7 is a flowchart of a procedure of the health check process performed by the base station control apparatus 1 according to the present embodiment.

As depicted in FIG. 7, when the health check process is started, the control unit 120 selects one base station 2 from the plurality of base stations 2 stored in the transmission information table 111 (Step S110).

When the process at Step S110 is finished, the control unit 120 decrements the transmission interval value corresponding to the selected base station 2 stored in the transmission information table 111 (Step S111). In other words, for example, if a "femto #1" is selected in the process at Step S110, the control unit 120 performs a process to change the transmission interval value stored in correlation with the "femto #1", from "5" to "4".

When the process at Step S111 is finished, the control unit 120 determines whether the transmission interval value corresponding to the base station 2 selected at Step S110 is "0" (Step S112). In the process, if it is determined that the transmission interval value is "0" (Yes at Step S112), the communication processing unit 124 transmits a health check signal to the base station 2 (Step S113), and the transmission period setting unit 122 resets the transmission interval value (at this point, the value is set to "0") stored in the transmission information table 111, to the transmission interval setting value (Step S114).

When the process at Step S114 is finished, or if the transmission interval value is not "0" at Step S112 (No at Step S112), the control unit 120 determines whether the series of processes at Steps S111 to S114 are performed for all the base stations 2 (Step S115). In the process, if it is determined that the series of processes are not performed for all the base stations 2 (No at Step S115), the control unit 120 proceeds to Step S110. If it is determined that the series of processes are performed for all the base stations 2 (Yes at Step S115), the control unit 120 finishes the health check process.

As described above, with the mobile communication system S according to the first embodiment, the transmission period of predetermined signals transmitted to the small base stations 2a to 2c is made longer than the transmission period to the base station 2d, which is not a small base station. Accordingly, even if small base stations are installed, it is possible to transmit a health check signal without applying a large transmission load to the base station control apparatus 1.

In the mobile communication system S according to the first embodiment, the transmission load applied to the base station control apparatus 1 is reduced, because the transmission period of the health check signal transmitted to the small base station is made longer than the transmission period of the health check signal transmitted to the large base station. In a mobile communication system according to a second embodiment of the present invention, the transmission period of the health check signal is further extended, for a small base station in which no mobile terminal is located, among the small base stations.

Figure 8:
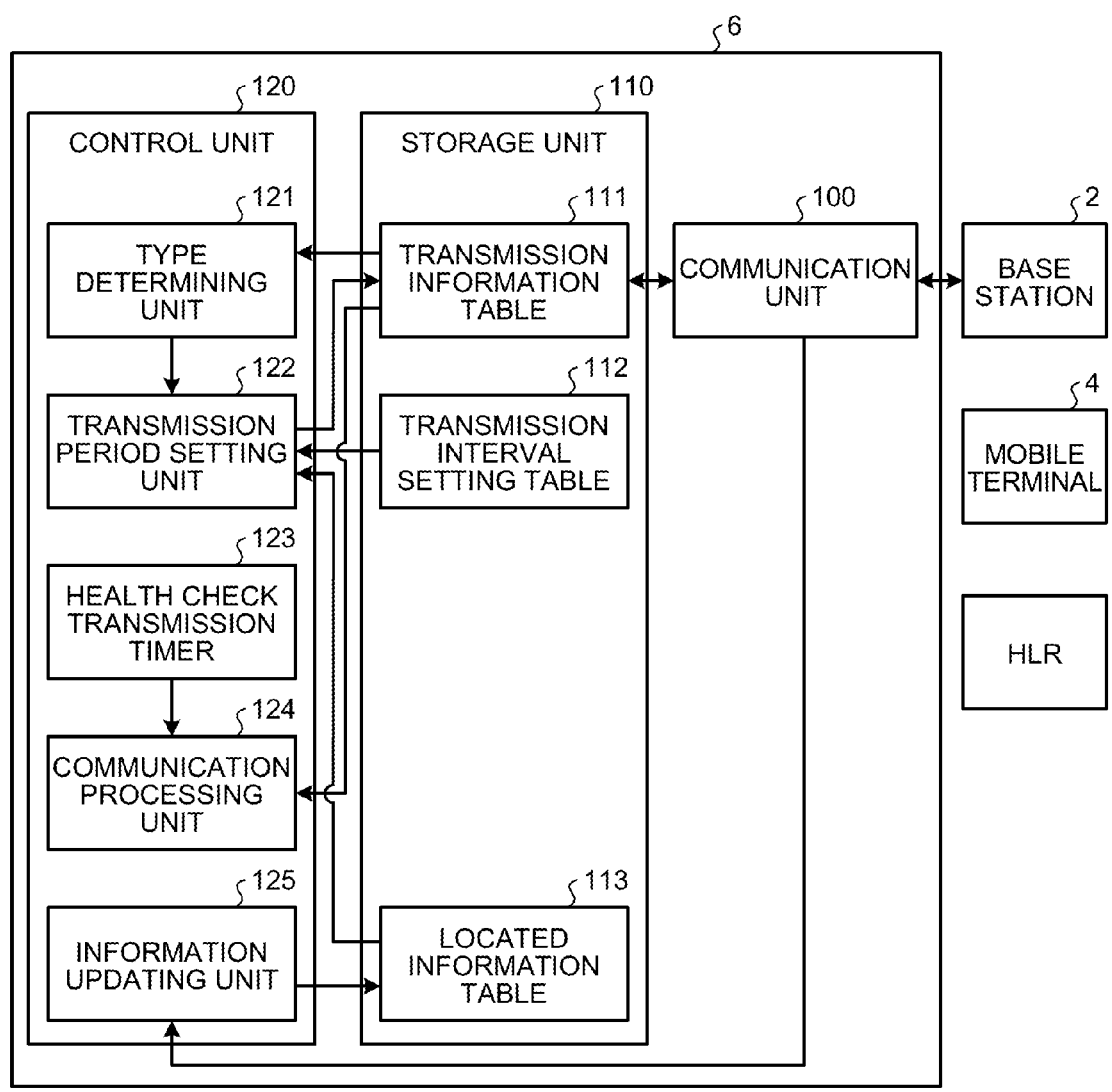
FIG. 8 is a block diagram of a configuration of a base station control apparatus according to a second embodiment.

An outline of the mobile communication system according to the second embodiment will now be described with reference to FIGS. 8 and 9. FIG. 8 is a block diagram of a configuration of the base station control apparatus according to the present embodiment. FIG. 9 is a schematic of an example of a located information table stored in the base station control apparatus. The same components as those already described are denoted by the same reference numerals, and the redundant descriptions thereof will be omitted.

As depicted in FIG. 8, a base station control apparatus 6 according to the present embodiment, in addition to the components included in the base station control apparatus 1 according to the first embodiment, further includes a located information table 113 in the storage unit 110 and an information updating unit 125 in the control unit 120.

The located information table 113, as depicted in FIG. 9, stores therein a base station number, a type of the base station 2, and the located number in correlation with a base station name. The located number here is the number of the mobile terminal 4 located in the cell 3 of the base station 2, and for example, as depicted in FIG. 9, one mobile terminal is located in the "femto #1", and three hundred mobile terminals are located in a "macro #1".

In this manner, the storage unit 110 of the base station control apparatus 6 according to the present embodiment functions as a storage unit that stores therein located terminal number information that is information related to the number of the mobile terminal 4 located in the cell 3 of the base station 2, for each base station.

The communication unit 100 and the communication processing unit 124 of the base station control apparatus 6 according to the present embodiment function as receiving units that receive predetermined information from the mobile terminal 4.

The information updating unit 125 functions as an information updating unit, and updates the located terminal number information, based on the predetermined information received from the mobile terminal 4, by the communication unit 100. More specifically, the information updating unit 125, as the predetermined information, receives a position registration signal (RA update request) transmitted when the mobile terminal 4 moves to the different base station 2, a detach signal (detach request) transmitted when the power of the mobile terminal 4 is turned off, and the like, from the mobile terminal 4.

The information updating unit 125, based on the pieces of information received from the mobile terminal 4, updates the information on the located number stored in the located information table 113. The updating method will be described later.

The transmission period setting unit 122 according to the present embodiment, when the located terminal number information indicates that the number of the mobile terminal 4 located in the cell 3 of the base station 2 corresponding to the located terminal number information is "0", extends the transmission period of the health check signal for the base station 2.

Figure 10:
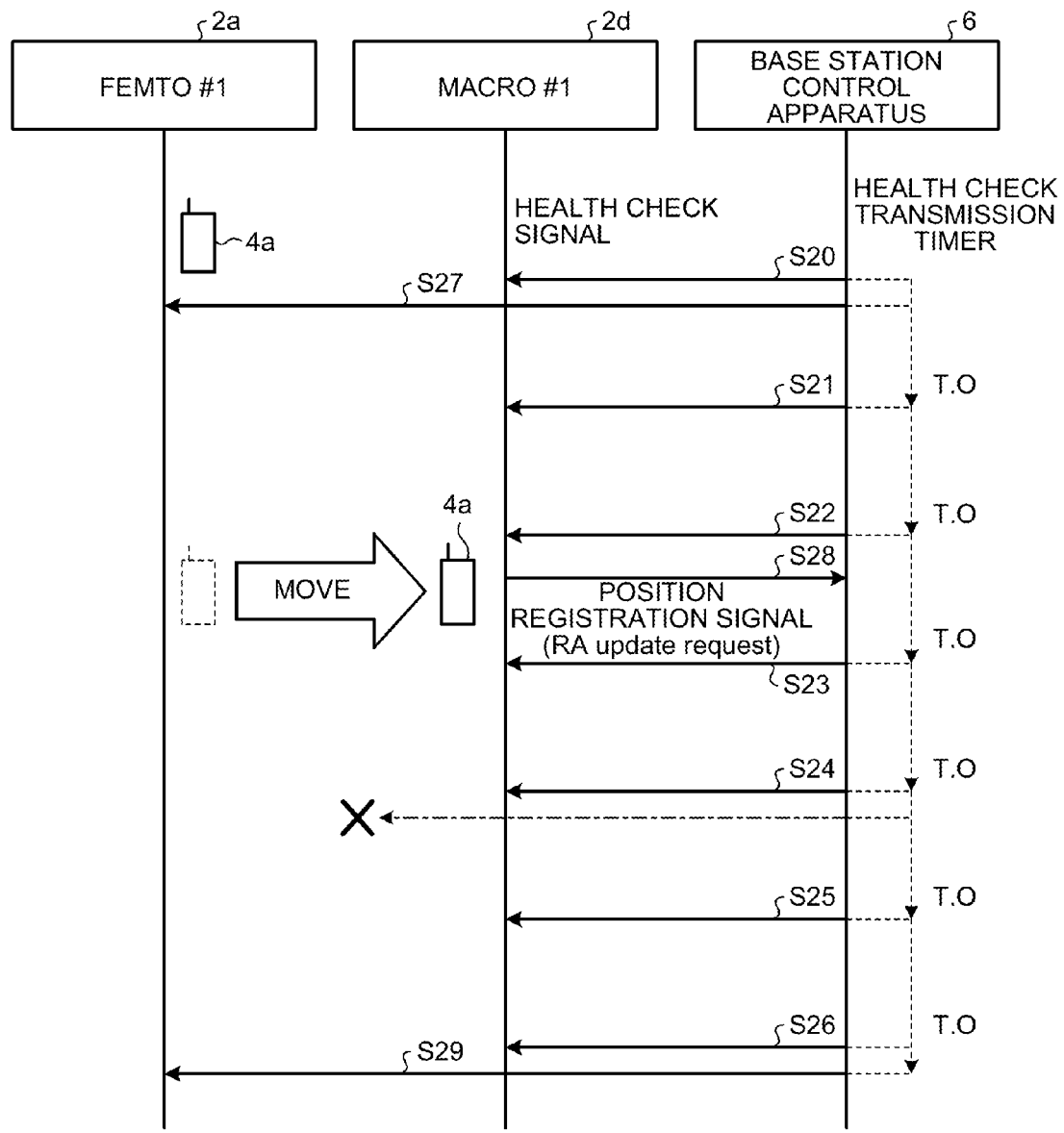
FIG. 10 is a schematic of a transmission method of a health check signal when a mobile terminal is not located in a small base station because the mobile terminal has moved.
Figure 11:
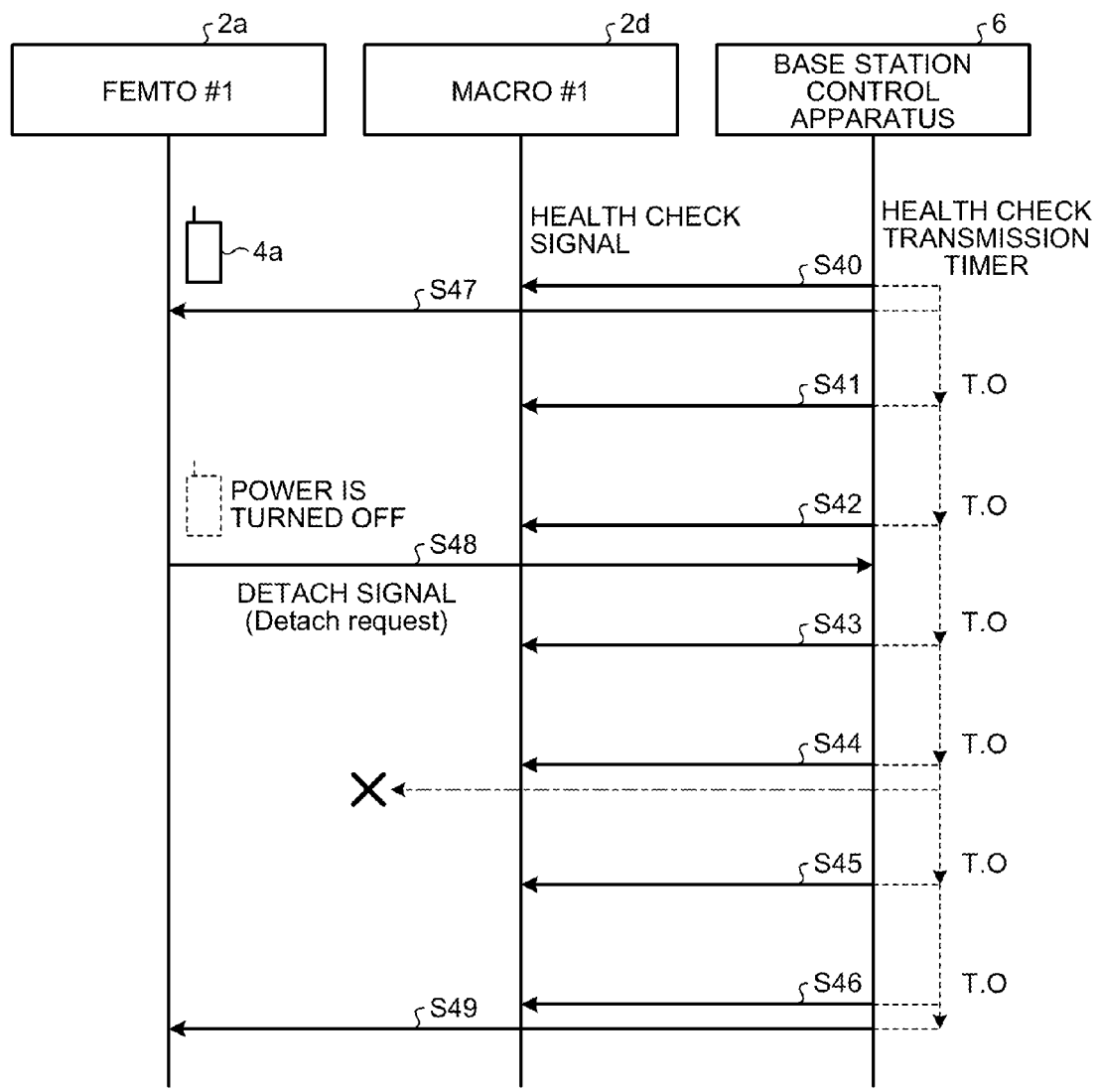
FIG. 11 is a schematic of a transmission method of a health check signal when a mobile terminal is not located in a small base station because the power of the mobile terminal is turned off.
Figure 12:
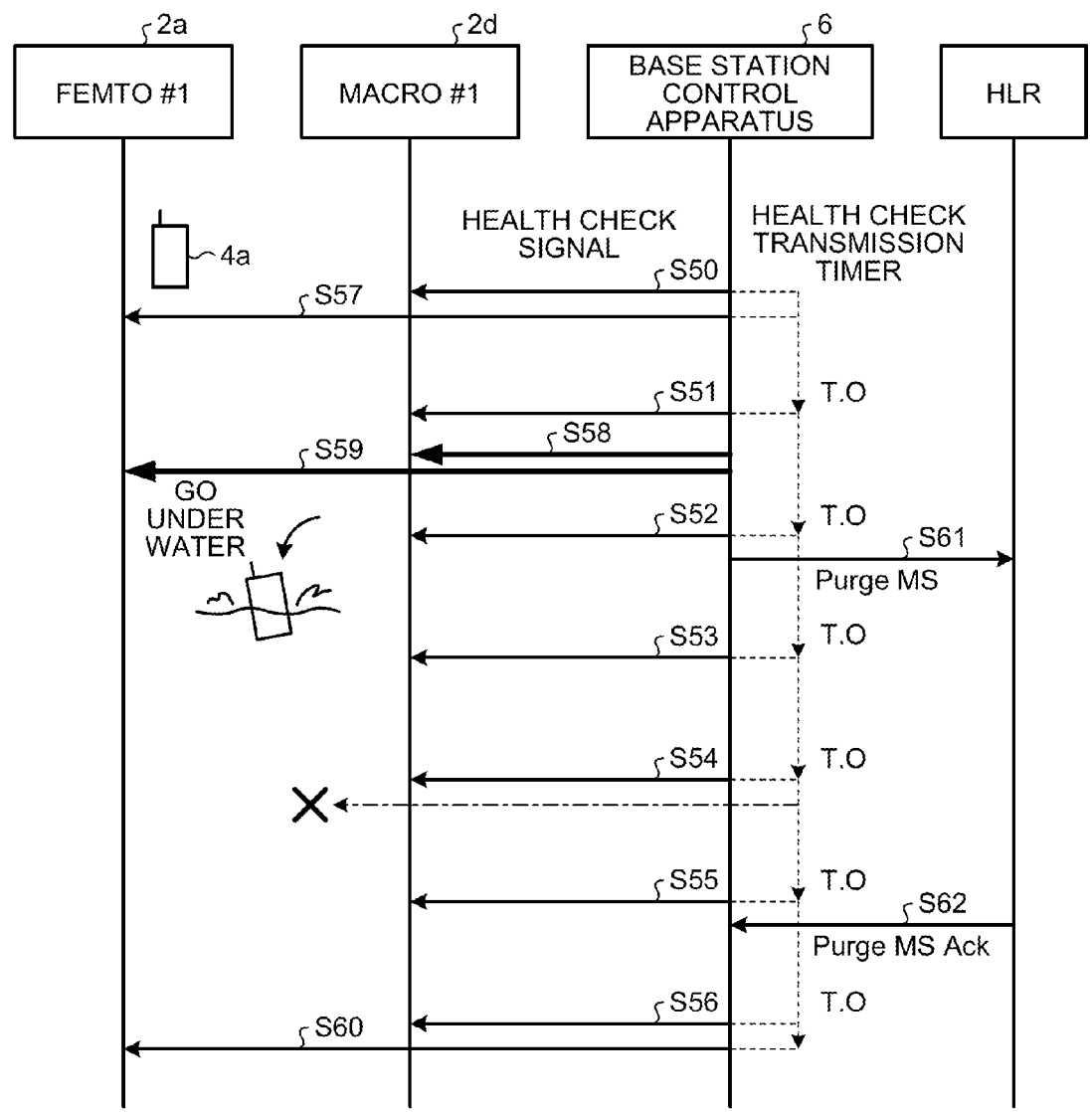
FIG. 12 is a schematic of a transmission method of a health check signal when a mobile terminal is not located in a small base station because the mobile terminal went under water.

A transmission method of a health check signal in the mobile communication system according to the present embodiment will now be described with reference to FIGS. 10 to 12. FIGS. 10 to 12 are schematics of a transmission method of a health check signal according to the present embodiment.

A transmission method of a health check signal when no mobile terminal 4 is located in the small base station 2, because the mobile terminal 4 has moved, will be described with reference to FIG. 10.

As depicted in FIG. 10, the base station control apparatus 6, similar to the first embodiment, transmits a health check signal to the "macro #1", which is a large base station, every time the health check transmission timer times out, by referring to the transmission information table 111 (Steps S20 to S26). The base station control apparatus 6 transmits a health check signal to the "femto #1", which is a small base station, every five times the health check transmission timer times out (Step S27).

When the mobile terminal 4a located in the "femto #1" moves to the cell 3d of the "macro #1" from the cell 3a of the "femto #1", the mobile terminal 4a transmits a position registration signal (RA update request) to the base station control apparatus 6 (Step S28). The position registration signal includes a base station number of the base station 2 in which the mobile terminal 4 was located until then, a base station number of the base station 2 in which the mobile terminal 4 is newly located, and the like.

On receiving the position registration signal, the base station control apparatus 6 updates the located information table 113. More specifically, the base station control apparatus 6 reduces the located number in the "femto #1" by one, and increases the located number in the "macro #1" by one, in the located information table 113.

When the health check transmission timer has timed out five times since a health check signal is transmitted to the "femto #1" at Step S27, the base station control apparatus 6 determines whether the located number in the "femto #1" is "0", by referring to the located information table 113. At this time, if the located number in the "femto #1" is "0", the base station control apparatus 6 extends the transmission period of the health check signal, and transmits a health check signal when the health check transmission timer times out two more times (Step S29).

On the contrary, when the mobile terminal 4 moves into the small base station 2 in which no mobile terminal 4 was located until then, the base station control apparatus 6 updates the located information table 113, and returns the extended transmission period to the original period.

Subsequently, a transmission method of a health check signal when no mobile terminal 4 is located in the small base station 2 because the power of the mobile terminal 4 is turned off will be described, with reference to FIG. 11.

As depicted in FIG. 11, the base station control apparatus 6, similar to the first embodiment, transmits a health check signal to the "macro #1", which is a large base station, every time the health check transmission timer times out, by referring to the transmission information table 111 (Steps S40 to S46). The base station control apparatus 6 transmits a health check signal to the "femto #1", which is a small base station, every five times the health check transmission timer times out (Step S47).

When the power of the mobile terminal 4a located in the "femto #1" is turned off, the mobile terminal 4a transmits a detach signal (detach request) to the base station control apparatus 6 (Step S48). On receiving the detach signal, the base station control apparatus 6 updates the located information table 113. More specifically, the base station control apparatus 6 reduces the located number in the "femto #1" by one, in the located information table 113.

The base station control apparatus 6, when the health check transmission timer has timed out five times, since a health check signal is transmitted to the "femto #1" at Step S47, determines whether the located number in the "femto #1" is "0", by referring to the located information table 113. At this time, if the located number in the "femto #1" is "0", the base station control apparatus 6 extends the transmission period of the health check signal, and transmits a health check signal when the health check transmission timer times out two more times (Step S49).

Subsequently, a transmission method of a health check signal when no mobile terminal 4 is located in the small base station 2 because the mobile terminal 4 went under water will be described with reference to FIG. 12.

As depicted in FIG. 12, the base station control apparatus 6, similar to the first embodiment, transmits a health check signal to the "macro #1", which is a large base station, every time the health check transmission timer times out, by referring to the transmission information table 111 (Steps S50 to S56). The base station control apparatus 6 transmits a health check signal to the "femto #1", which is a small base station, every five times the health check transmission timer times out (Step S57).

The base station control apparatus 6 periodically confirms the presence of the mobile terminal 4, and checks whether any mobile terminal 4 becomes not located (Steps S58 and S59).

If the power of the mobile terminal 4a located in the "femto #1" is turned off because it went under water and the like, the base station control apparatus 6 detects that the mobile terminal 4a becomes not located, and updates the information in the located information table 113. More specifically, the base station control apparatus 6 performs a process to reduce the located number in the "femto #1" by one, in the located information table 113.

The base station control apparatus 6, when the health check transmission timer has timed out five times since a health check signal is transmitted to the "femto #1" at Step S57, determines whether the located number in the "femto #1" is "0", by referring to the located information table 113. At this time, if the located number in the "femto #1" is "0", the base station control apparatus 6 extends the transmission period of the health check signal, and transmits a health check signal when the health check transmission timer times out two more times (Step S60).

"If the located number is 0" indicates the state when none of the mobile terminals 4 is located in the cell 3 of the base station 2. Accordingly, even if the base station 2 goes down in such a state, for example, none of the mobile terminals 4 will be affected by the down. In this manner, even if the transmission period of the health check signal is extended when the located number of the base station is "0", it is possible to reduce the transmission load applied to the base station control apparatus 6, without affecting the communication environment of the mobile terminal 4.

The base station control apparatus 6, on detecting that the mobile terminal 4a becomes not located, transmits a purge MS signal to the HLR, which is the other main network node that forms the core network (Step S61), and receives a purge MS Ack signal from the HLR (Step S62).

An example of a specific operation performed by the base station control apparatus 6 according to the second embodiment will now be specifically described with reference to FIGS. 13 to 16.

Figure 13:
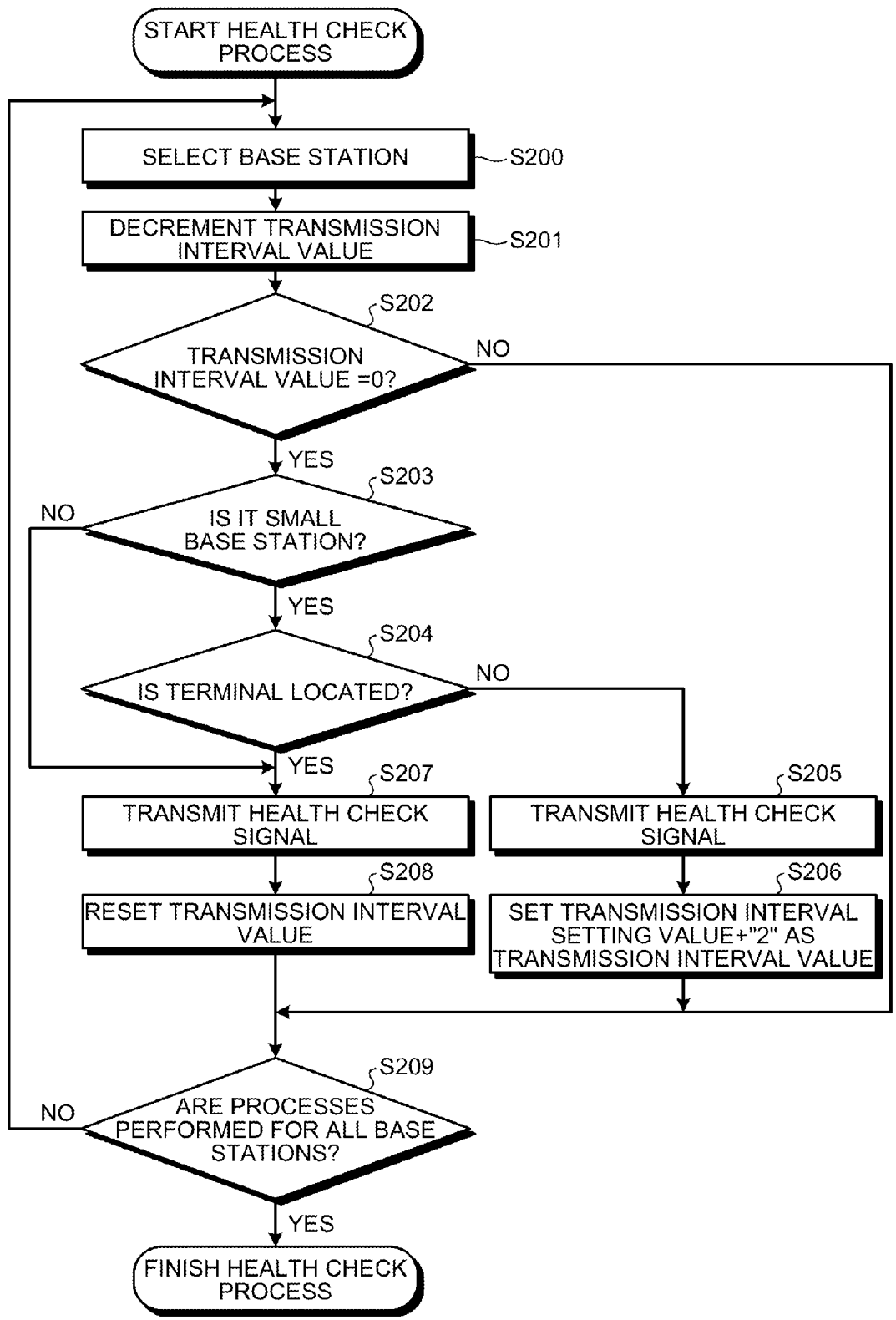
FIG. 13 is a flowchart of a procedure of a health check process according to the second embodiment.

A health check process performed by the base station control apparatus 6 according to the present embodiment will be described with reference to FIG. 13. FIG. 13 is a flowchart of a health check process performed by the base station control apparatus 6 according to the second embodiment. The main process related to the transmission of a health check signal preformed by the base station control apparatus 6 according to the present embodiment is similar to that of the first embodiment. Accordingly, the description thereof will be omitted.

As depicted in FIG. 13, when the health check process is started, the control unit 120 of the base station control apparatus 6 selects one base station 2 from the plurality of base stations stored in the transmission information table 111 (Step S200). The control unit 120 then decrements a transmission interval value corresponding to the selected base station 2, stored in the transmission information table 111 (Step S201).

On finishing the process at Step S201, the control unit 120 determines whether the transmission interval value corresponding to the base station 2 selected at Step S200 is "0" (Step S202). In the process, if it is determined that the transmission interval value is "0" (Yes at Step S202), the control unit 120 proceeds to Step S203.

At Step S203, the type determining unit 121 determines whether the type of the base station 2 selected at Step S200 is a small base station. In the process, if it is determined that the type of the base station is a small base station (Yes at Step S203), the type determining unit 121 proceeds to Step S204.

At Step S204, the control unit 120 determines whether the mobile terminal 4 is located in the cell 3 of the base station 2 selected at Step S200. The determination is made depending on whether the located number of the base station 2 in the located information table 113 is "0". In the process, if no mobile terminal 4 is located in the cell 3 of the base station 2 (No at Step S204), the communication processing unit 124 transmits a health check signal to the base station 2 (Step S205).

The transmission period setting unit 122 then sets a transmission interval value stored in the transmission information table 111 (at this point, the value is set to "0") to the number in which a predetermined number is added to the transmission interval setting value (Step S206). The predetermined number is "2".

At Step S203, if the type of the base station 2 selected at Step S200 is not a small base station (No at Step S203), or if the mobile terminal 4 is located in the cell 3 of the base station 2 selected at Step S200, at Step S204 (Yes at Step S204), the control unit 120 proceeds to Step S207.

At Step S207, the communication processing unit 124 transmits a health check signal to the base station 2 selected at Step S200. The transmission period setting unit 122 resets the transmission interval value (at this point, the value is set to "0") stored in the transmission information table 111, to the transmission interval setting value (Step S208).

On finishing the processes at Steps S206 and S208, or if the transmission interval value is not "0" at Step S202 (No at Step S202), the control unit 120 determines whether the series of processes at Steps S201 to S207 are performed for all the base stations 2 (Step S209).

In the process, if the series of processes are not performed for all the base stations 2 (No at Step S209), the control unit 120 proceeds to Step S200. Alternatively, if it is determined that the series of processes are performed for all the base stations 2 (Yes at Step S209), the control unit 120 finishes the health check process.

Figure 14:
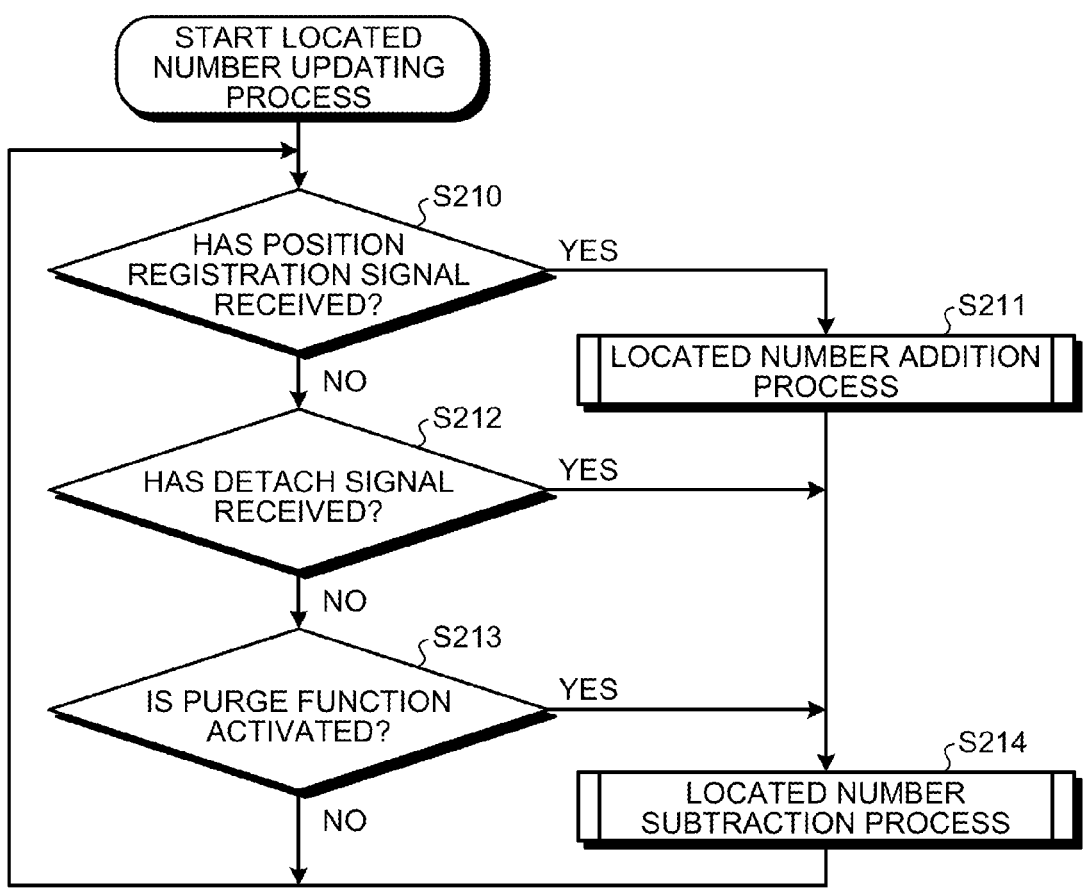
FIG. 14 is a flowchart of a procedure of a located number updating process according to the second embodiment.

Subsequently, a procedure of a located number updating process according to the present embodiment will be specifically described with reference to FIG. 14. FIG. 14 is a flowchart of the procedure of the located number updating process performed by the base station control apparatus 6 according to the present embodiment.

As depicted in FIG. 14, when the located number updating process is started, the communication processing unit 124 determines whether a position registration signal is received from the mobile terminal 4 (Step S210). In the process, if it is determined that the position registration signal is received from the mobile terminal 4 (Yes at Step S210), the communication processing unit 124 performs a located number addition process (Step S211). The located number addition process is a series of processes at Steps S220 to S224 in FIG. 15, which will be described later.

At Step S210, if the position registration signal is not received from the mobile terminal 4 (No at Step S210), the communication processing unit 124 determines whether a detach signal is received from the mobile terminal 4 (Step S212). In the process, if it is determined that the detach signal is not received from the mobile terminal 4 (No at Step S212), the communication processing unit 124 proceeds to Step S213.

At Step S213, the control unit 120 determines whether a purge function is activated. The determination is made depending on whether the mobile terminal 4 not located because it went under water and the like is detected. In the process, if it is determined that the purge function is not activated (No at Step S213), the control unit 120 proceeds to S210.

When the process at Step S211 is finished, or if it is determined that the detach signal is received from the mobile terminal 4 at Step S212 (Yes at Step S212), or if it is determined that the purge function is activated at Step S213 (Yes at Step S213), the control unit 120 performs a located number subtraction process (Step S214). The located number subtraction process is a series of processes at Steps S240 to S242 in FIG. 16, which will be described later.

Figure 15:
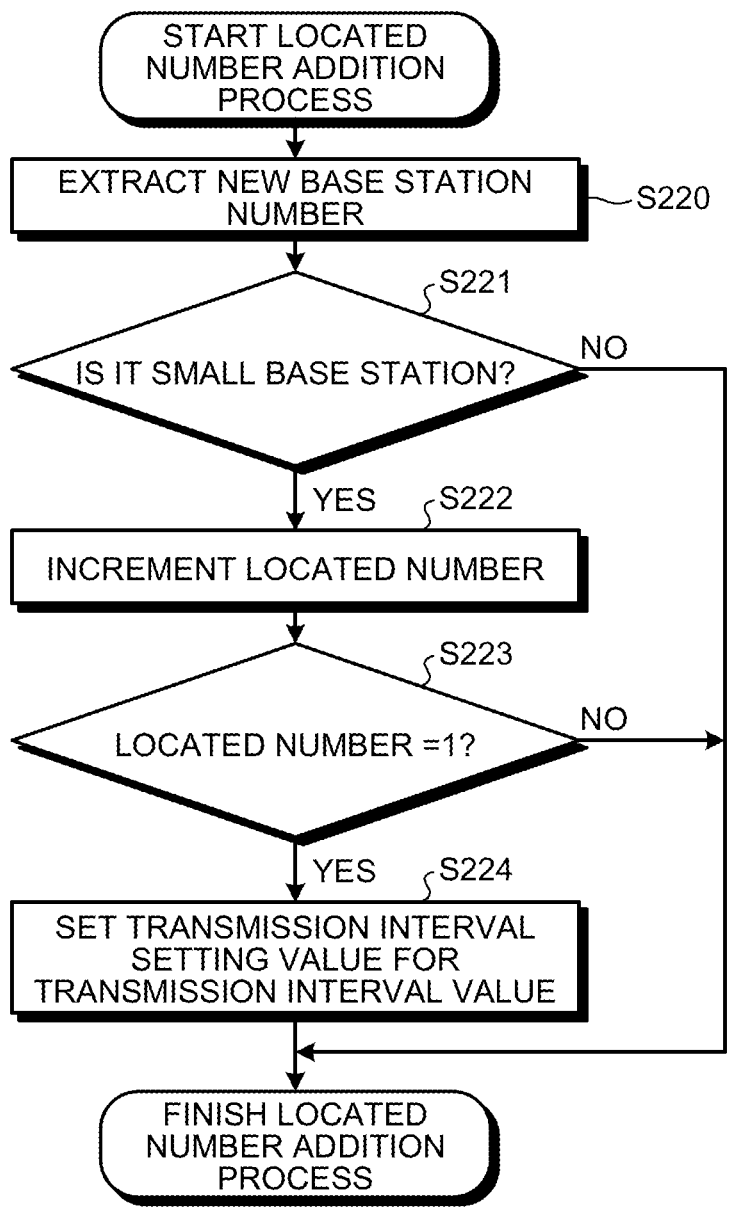
FIG. 15 is a flowchart of a procedure of a located number addition process according to the second embodiment.

Subsequently, the located number addition process at Step S211 will be described specifically with reference to FIG. 15. FIG. 15 is a flowchart of a procedure of the located number addition process performed by the base station control apparatus 6 according to the present embodiment.

As depicted in FIG. 15, when the located number addition process is started, the control unit 120 extracts a base station number of the base station 2 in which the mobile terminal 4 is newly located, based on the position registration signal received from the mobile terminal 4 (Step S220).

On finishing the process at Step S220, the type determining unit 121 determines whether the base station 2 having the extracted base station number is a small base station, by referring to the transmission information table 111 (Step S221). In the process, if it is determined that the base station 2 is a small base station (Yes at Step S221), the type determining unit 121 proceeds to Step S222.

At Step S222, the control unit 120 increments the located number corresponding to the base station 2 stored in the located information table 113. In other words, if the base station 2 is the "femto #1", the control unit 120 changes the located number stored in correlation with the "femto #1", from "1" to "2".

On finishing the process at Step S222, the control unit 120 determines whether the located number of the base station 2 is "1", by referring to the located information table 113 (Step S223). In the process, if it is determined that the located number of the base station 2 is "1" (Yes at Step S223), the control unit 120 changes the transmission interval value to the transmission interval setting value (Step S224).

In other words, if a state where no mobile terminal 4 has been located is shifted to another state where the mobile terminal 4 is located (corresponding to the located number of "1"), the control unit 120 returns the extended transmission period of the health check signal to the original period, by changing the increased transmission interval value to the original value (the same value as the transmission interval setting value).

If the transmission interval value is smaller than the transmission interval setting value (such as when the transmission interval value is "2" and the transmission interval setting value is "5"), because the health check transmission timer has timed out a few times after the transmission interval value is increased, the process at Step S224 may not be performed.

On finishing the process at Step S224, or if the base station 2 having the extracted base station number is not a small base station at Step S221 (No at Step S221), or if the located number of the base station 2 is not "1" at Step S223 (No at Step S223), the control unit 120 finishes the located number addition process.

Figure 16:
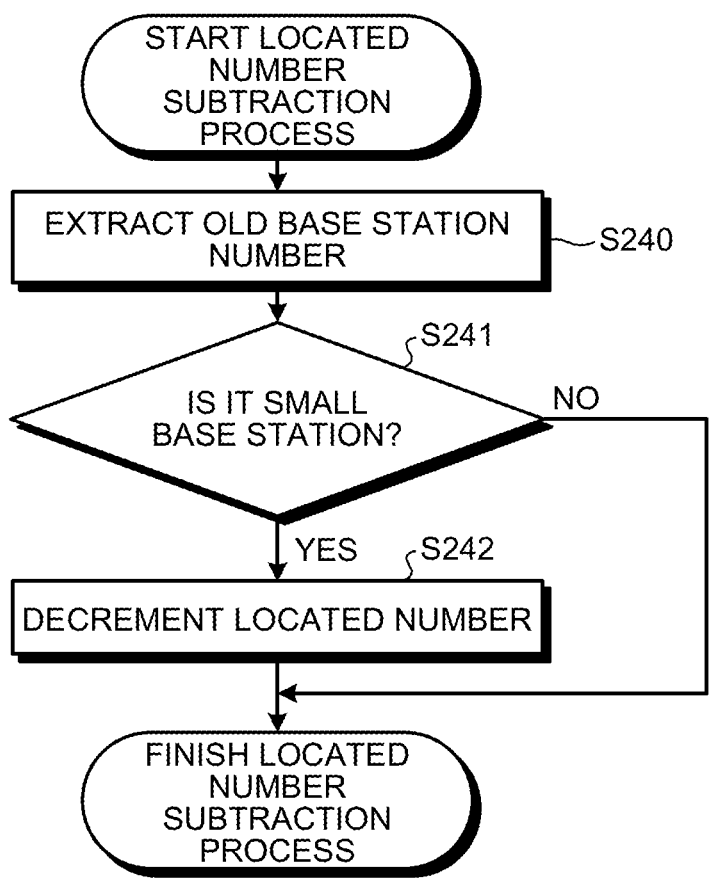
FIG. 16 is a flowchart of a procedure of a located number subtraction process according to the second embodiment.

Subsequently, the located number subtraction process at Step S214 will be specifically described with reference to FIG. 16. FIG. 16 is a flowchart of a procedure of the located number subtraction process performed by the base station control apparatus 6 according to the present embodiment.

As depicted in FIG. 16, when the located number subtraction process is started, the control unit 120 extracts a base station number of the base station 2 in which the mobile terminal 4 was located until then, based on the position registration signal received from the mobile terminal 4 (Step S240).

On finishing the process at Step S240, the control unit 120 determines whether the base station 2 having the extracted base station number is a small base station, by referring to the transmission information table 111 (Step S241). In the process, if it is determined that the base station 2 is a small base station (Yes at Step S241), the control unit 120 proceeds to Step S242.

At Step S242, the control unit 120 decrements the located number corresponding to the base station 2 stored in the located information table 113. In other words, for example, if the base station 2 is the "femto #1", the control unit 120 changes the located number stored in correlation with the "femto #1", from "1" to "0".

On finishing the process at Step S242, or if the base station 2 having the extracted base station number is not a small base station at Step S241 (No at Step S241), the control unit 120 finishes the located number subtraction process.

As described above, with the mobile communication system according to the second embodiment, it is possible to further reduce the transmission load applied to the base station control apparatus 6, by further extending the transmission period of the health check signal transmitted to the small base station in which no mobile terminal 4 is located, among the small base stations.

In the present embodiment, the transmission period of the health check signal is extended for the small base station in which no mobile terminal 4 is located. It is also possible not to transmit the health check signal at all. In such a case, the transmission period setting unit 122 of the base station control apparatus 6, if the located terminal number information indicates that the number of the mobile terminal 4 located in the cell 3 of the base station 2 corresponding to the located terminal number information is "0", sets so that the health check signal is not transmitted to the base station 2.

More specifically, at Step S204 in FIG. 13, if no mobile terminal 4 is located in the cell 3 of the base station 2 selected at Step S200 (No at Step S204), the control unit 120 proceeds to Step S209 without performing the processes at Steps S205 and S206.

In this manner, the transmission load applied to the base station control apparatus 6 can further be reduced, by not transmitting a health check signal for the small base station in which no mobile terminal 4 is located, among the small base stations.

In the mobile communication system according to the second embodiment, the transmission period of the health check signal is changed depending on the number of the mobile terminal 4 located in the small base station. In a third embodiment, the base station control apparatus manages the terminal information of the mobile terminal 4, and the transmission period of a health check signal is changed based on the information.

Figure 17:
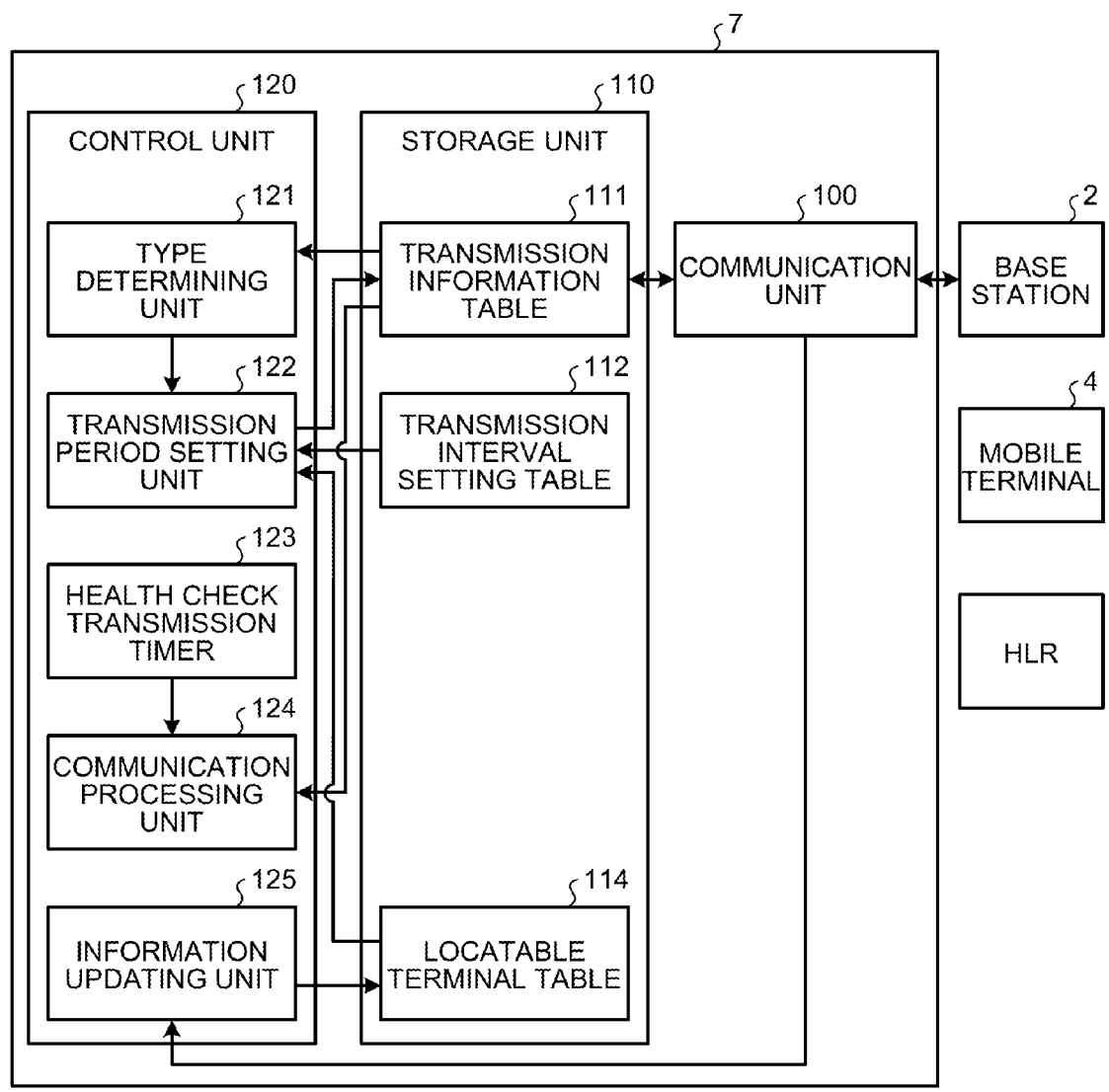
FIG. 17 is a block diagram of a configuration of a base station control apparatus according to a third embodiment.

A mobile communication system according to the third embodiment is now described with reference to FIGS. 17 and 18. FIG. 17 is a block diagram of a configuration of a base station control apparatus according to the present embodiment. FIG. 18 is a schematic of an example of a locatable terminal table stored in the base station control apparatus. The same components as those already described are denoted by the same reference numerals, and the redundant descriptions thereof will be omitted.

As depicted in FIG. 17, a base station control apparatus 7 according to the present embodiment, in addition to the components included in the base station control apparatus 1 according to the first embodiment, further includes a locatable terminal table 114 in the storage unit 110. The locatable terminal table 114, as depicted in FIG. 18, stores therein an identifier of the mobile terminal 4 that can be located in the cell 3 of the base station 2 and a located condition that indicates whether the mobile terminal 4 is located in the cell 3 of the base station 2, in correlation with a base station number of the base stations 2.

In this manner, the storage unit 110 of the base station control apparatus 7 according to the present embodiment functions as a storage unit that stores therein locatable terminal information related to an individual located state of all the mobile terminals 4 that can be located in the cell 3 of the base stations 2, for each base station 2.

Similar to the second embodiment, the communication unit 100 and the communication processing unit 124 of the base station control apparatus 7 according to the present embodiment function as receiving units that receive predetermined information from the mobile terminal 4.

The information updating unit 125 functions as an information updating unit, and updates the locatable terminal information based on the predetermined information received from the mobile terminal 4, by the communication unit 100.

The transmission period setting unit 122 according to the present embodiment, if the locatable terminal information indicates that all the mobile terminals 4 that can be located in the cell 3 of the base station 2 corresponding to the locatable terminal information are not located at all, extends the transmission period of a health check signal transmitted to the base station 2.

An example of a specific operation performed by the base station control apparatus 7 according to the third embodiment will now be described with reference to FIGS. 19 to 21.

A health check process performed by the base station control apparatus 7 according to the present embodiment will be described with reference to FIG. 19. FIG. 19 is a flowchart of a procedure of the health check process performed by the base station control apparatus 7 according to the third embodiment. The main process related to the transmission of the health check signal performed by the base station control apparatus 7 according to the present embodiment is similar to that of the base station control apparatus 1 according to the first embodiment. Accordingly, the description thereof will be omitted.

Figure 19:
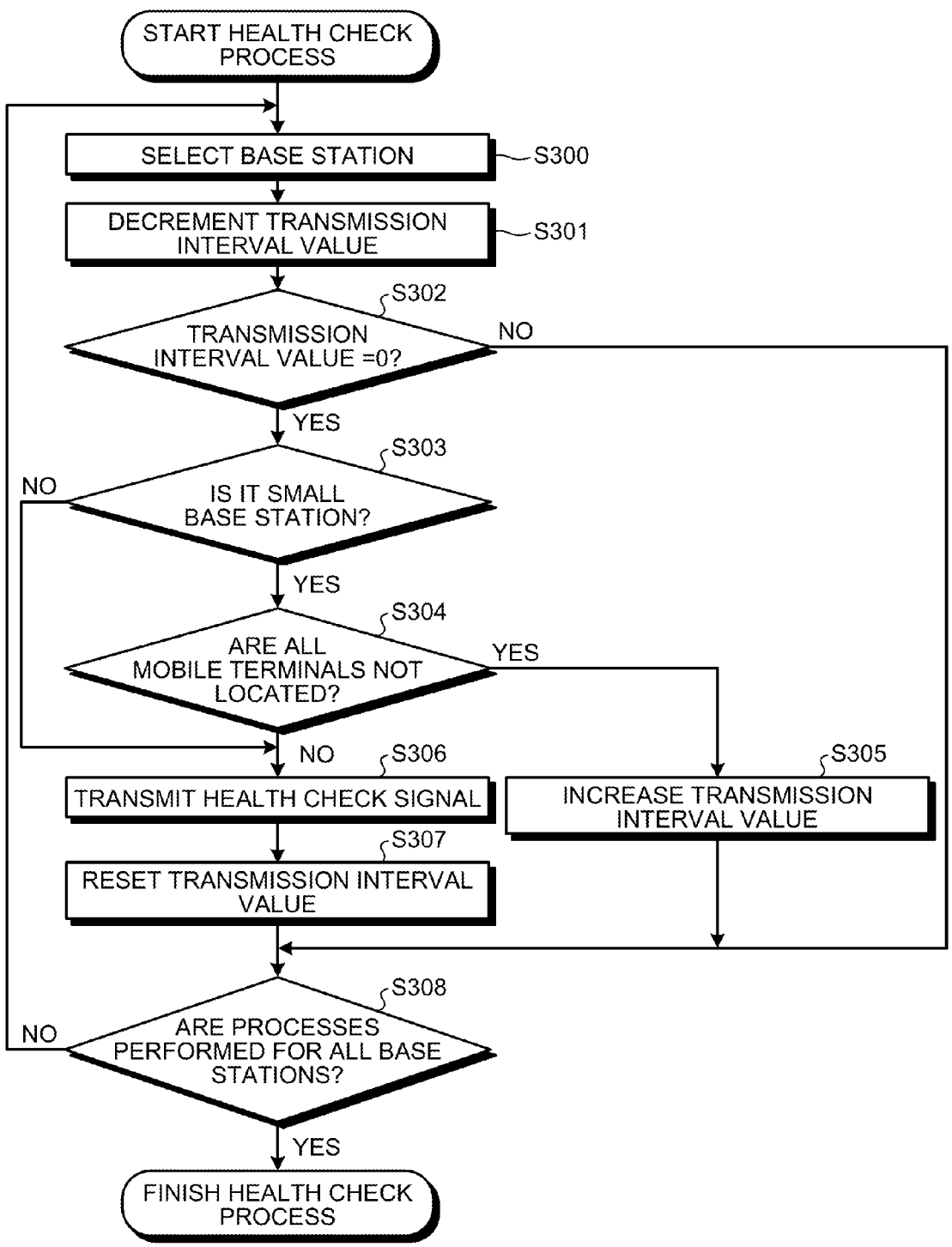
FIG. 19 is a flowchart of a procedure of a health check process according to the third embodiment.

As depicted in FIG. 19, when the health check process is started, the control unit 120 of the base station control apparatus 7 selects one base station 2 from the plurality of base stations stored in the transmission information table 111 (Step S300). The control unit 120 then decrements a transmission interval value corresponding to the selected base station 2 stored in the transmission information table 111 (Step S301).

On finishing the process at Step S301, the control unit 120 determines whether the transmission interval value corresponding to the base station 2 selected at Step S300 is "0" (Step S302). In the process, if it is determined that the transmission interval value is "0" (Yes at Step S302), the control unit 120 proceeds to Step S303.

At Step S303, the type determining unit 121 determines whether the type of the base station 2 selected at Step S300 is a small base station. In the process, if it is determined that the type of the base station is a small base station (Yes at Step S303), the control unit 120 proceeds to Step S304.

At Step S304, the control unit 120 determines whether all the mobile terminals 4 that can be located in the cell of the base station 2 selected at Step S300 are not located. The determination is made depending on whether all the mobile terminals 4 correlated with the base station number of the base station 2 are all "not located", by referring to the locatable terminal table 114. In the process, if it is determined that all the mobile terminals that can be located in the cell 3 of the base station 2 selected at Step S300 are not located (Yes at Step S304), the control unit 120 increases the transmission interval value of the base station 2 in the transmission information table 111 (Step S305).

If the type of the base station 2 selected at Step S300 is not a small base station (No at Step S303), or when even one mobile terminal 4 that can be located in the cell of the base station 2 selected at Step S300 is present (No at Step S304), the control unit 120 proceeds to Step S306.

At Step S306, the communication processing unit 124 transmits a health check signal to the base station 2 selected at Step S300. The transmission period setting unit 122 resets the transmission interval value (at this point, the value is set to "0") stored in the transmission information table 111 to the transmission interval setting value (Step S307).

On finishing the processes at Steps S305 and S307, or if the transmission interval value is not "0" at Step S302 (No at Step S302), the control unit 120 determines whether the series of processes at Steps S301 to S307 are performed for all the base stations 2 (Step S308). In the process, if it is determined that the series of processes are not performed for all the base stations 2 (No at Step S308), the control unit 120 proceeds to Step S300. If it is determined that the series of processes are performed for all the base stations 2 (Yes at Step S308), the control unit 120 finishes the health check process.

Subsequently, a located number addition process performed by the base station control apparatus 7 according to the present embodiment will be specifically described with reference to FIG. 20. FIG. 20 is a flowchart of a procedure of the located number addition process performed by the base station control apparatus 7 according to the present embodiment.

Figure 20:
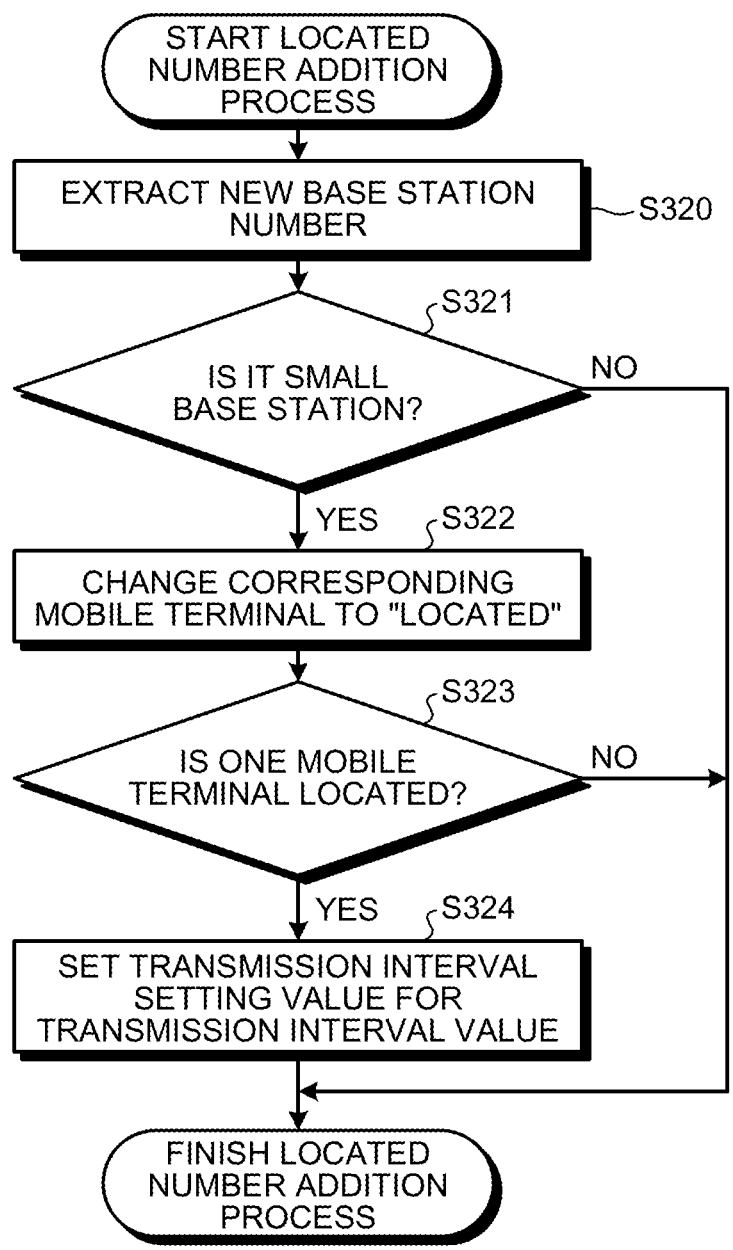
FIG. 20 is a flowchart of a procedure of a located number addition process according to the third embodiment.

As depicted in FIG. 20, when the located number addition process is started, the control unit 120 extracts a base station number of the base station 2 in which the mobile terminal 4 is newly located, based on the position registration signal received from the mobile terminal 4 (Step S320).

On finishing the process at Step S320, the type determining unit 121 determines whether the base station 2 having the extracted base station number is a small base station, by referring to the transmission information table 111 (Step S321). In the process, if it is determined that the base station 2 is a small base station (Yes at Step S321), the type determining unit 121 proceeds to Step S322.

At Step S322, the control unit 120 changes the located state of the mobile terminal 4 that transmitted the position registration signal to "located", by referring to a section of the base station 2 in the locatable terminal table 114.

On finishing the process at Step S322, the control unit 120 determines whether the number of the mobile terminal 4 located in the base station 2 is one, by referring to the locatable terminal table 114 (Step S323). In the process, if it is determined that the number of the mobile terminal 4 located in the base station 2 is one (Yes at Step S323), the transmission period setting unit 122 changes the transmission interval value to the transmission interval setting value (Step S324).

In other words, the transmission period setting unit 122, when the mobile terminal 4 is changed in the state of being located from the state of not located in a certain base station 2, changes the increased transmission interval value to the original value (the same value as the transmission interval setting value). Accordingly, the extended transmission period of the health check signal is returned to the initial value.

If the transmission interval value is smaller than the transmission interval setting value, because the health check transmission timer has timed out a few times after the transmission interval value is increased, the process at Step S324 may not be performed.

On finishing the process at Step S324, or if the base station 2 having the extracted base station number is not a small base station at Step S321 (No at Step S321), or if the number of the mobile terminal 4 located in the base station 2 is not one at Step S323 (No at Step S323), the control unit 120 finishes the located number addition process.

Subsequently, a located number subtraction process performed by the base station control apparatus 7 according to the present embodiment will be described in detail with reference to FIG. 21. FIG. 21 is a flowchart of a procedure of the located number subtraction process performed by the base station control apparatus 7 according to the present embodiment.

Figure 21:
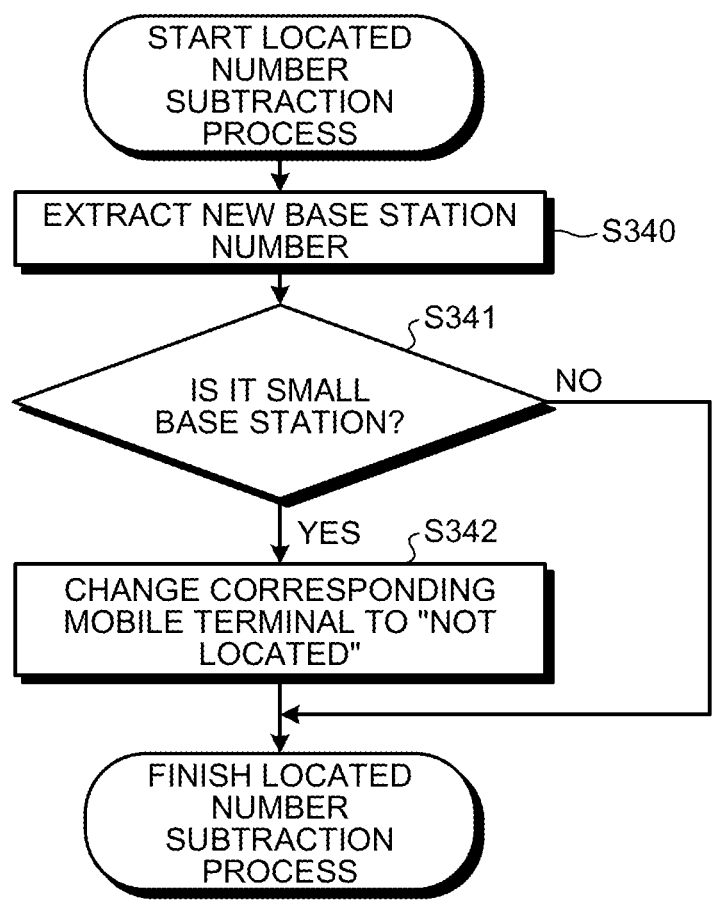
FIG. 21 is a flowchart of a procedure of a located number subtraction process according to the third embodiment.

As depicted in FIG. 21, when the located number subtraction process is started, the control unit 120 extracts a base station number of the base station 2 in which the mobile terminal 4 was located until then, based on the position registration signal received from the mobile terminal 4 (Step S340).

On finishing the process at Step S340, the type determining unit 121 determines whether the base station 2 having the extracted base station number is a small base station, by referring to the transmission information table 111 (Step S341). In the process, if it is determined that the base station 2 is a small base station (Yes at Step S341), the type determining unit 121 proceeds to Step S342.

At Step S342, the control unit 120 changes the located state of the mobile terminal 4 that transmitted the position registration signal to "not located", by referring to the section of the base station 2 in the locatable terminal table 114.

On finishing the process at Step S342, or if it is determined that the base station 2 having the extracted base station number is not a small base station at Step S341 (No at Step S341), the control unit 120 finishes the located number subtraction process.

As described above, with the mobile communication system according to the third embodiment, the base station control apparatus 7 manages the locatable terminal information. Accordingly, based on the locatable terminal information, the transmission period of the health check signal is further extended for the small base station in which no mobile terminal 4 is located, among the small base stations. Subsequently, it is possible to further reduce the transmission load applied to the base station control apparatus 7.

In the present embodiment, the transmission period of the health check signal is extended, for the small base station in which no mobile terminal 4 is located. It is also possible not to transmit the health check signal at all. In such a case, the transmission period setting unit 122 of the base station control apparatus 7, if the locatable terminal information indicates that all the mobile terminals 4 that can be located in the cell 3 of the base station 2 corresponding to the locatable terminal information are not located, sets so that the health check signal is not transmitted to the base station 2.

More specifically, at Step S304 in FIG. 19, if no mobile terminal 4 is located in the cell 3 of the base station 2 selected at Step S300 (Yes at Step S304), the control unit 120 proceeds to Step S307 without performing the process at Step S305.

In this manner, it is possible to further reduce the transmission load applied to the base station control apparatus 7, by not transmitting a health check signal to the small base station in which no mobile terminal 4 is located, among the small base stations.

In the mobile communication system according to the embodiments, a predetermined signal transmitted from the base station control apparatus is regarded as a health check signal. However, it is not limited thereto, and the predetermined signal may be a reception notification signal for detecting a mobile terminal to be connected.

Figure 22:
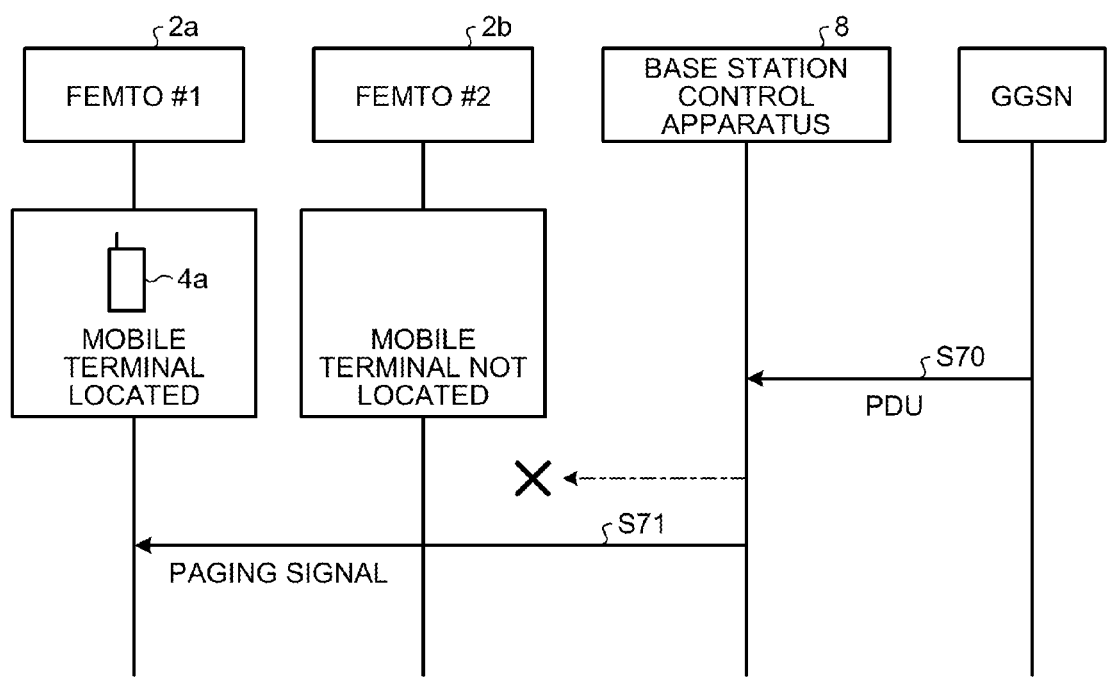
FIG. 22 is a schematic of a transmission method of a paging signal according to a fourth embodiment.

A mobile communication system according to a fourth embodiment will now be described with reference to FIG. 22. FIG. 22 is a schematic of a transmission method of a paging signal used as the reception notification signal of a base station control apparatus according to the fourth embodiment. The same components as those already described are denoted by the same reference numerals, and the redundant descriptions thereof will be omitted.

As depicted in FIG. 22, a base station control apparatus 8 according to the present embodiment, on receiving a protocol data unit (PDU) notification request from the GGSN, which is the main network node of the core network (Step S70), transmits a reception notification signal, or a paging signal, for each base station 2 (Step S71). In the present embodiment, an example of the reception notification signal is a paging signal. The paging signal is a signal concurrently transmitted to all the mobile terminals present in the cell 3 of the base station 2 via the base station 2, and for example, is a signal including a reception notification, concurrent calls, a control signal, and the like.

At this time, the base station control apparatus 8 does not transmit the paging signal (or extends the transmission period) for the base station 2 in which the located number is "0" or all the mobile terminals 4 that can be located are not located, by referring to the located information table 113 or the locatable terminal table 114. In other words, as depicted in FIG. 22, when the mobile terminal 4a is located in the "femto #1" but no mobile terminal 4 is located in the "femto #2", the base station control apparatus 8 transmits a paging signal to the "femto #1", but does not transmit a paging signal to the "femto #2".

"If the located number is 0" indicates the state when none of the mobile terminals 4 is located in the cell 3 of the base station 2. For example, in such a state, even if the paging signal is not transmitted to the base station 2, none of the mobile terminals 4 will be affected. Accordingly, even if the paging signal is not transmitted when the located number in the base station is "0", it is possible to reduce the transmission load applied to the base station control apparatus 8, without affecting the communication environment of the mobile terminal 4.

Figure 23:
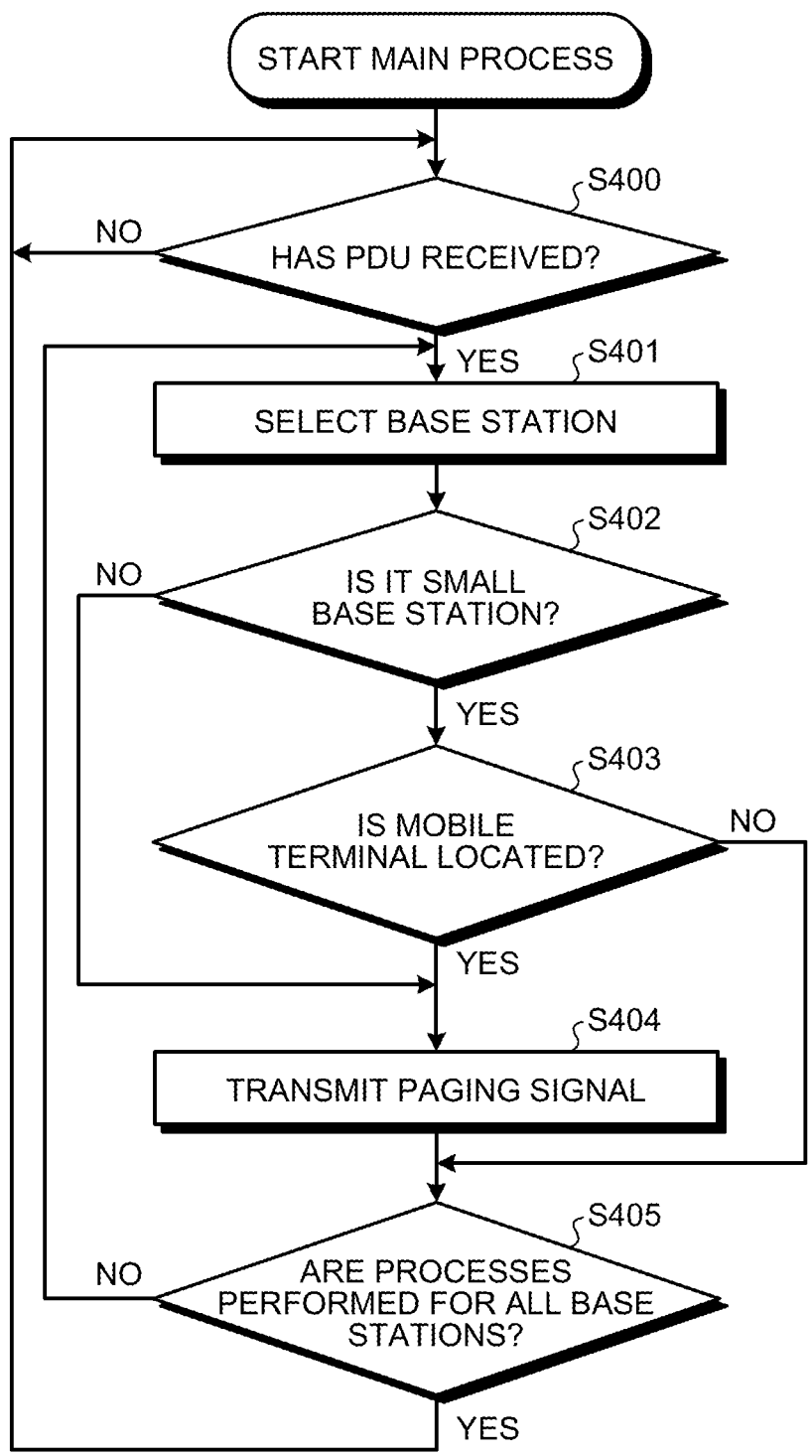
FIG. 23 is a flowchart of a procedure of a main process related to a transmission of the paging signal performed by a base station control apparatus according to the fourth embodiment.

The main process related to the transmission of a paging signal performed by the base station control apparatus 8 according to the fourth embodiment will be specifically described with reference to FIG. 23. FIG. 23 is a flowchart of a procedure of the main process related to the transmission of the paging signal performed by the base station control apparatus according to the fourth embodiment.

As depicted in FIG. 23, when the main process related to the transmission of the paging signal is started, the communication processing unit 124 of the base station control apparatus 8 determines whether a PDU signal is received from the GGSN (Step S400). In the process, if it is determined that the PDU signal is received from the GGSN (Yes at Step S400), the control unit 120 proceeds to the Step S401.

At Step S401, the control unit 120 selects one base station 2 from the plurality of base stations stored in the transmission information table 111. The type determining unit 121 determines whether the type of the selected base station 2 is a small base station (Step S402). In the process, if it is determined that the type of the base station is a small base station (Yes at Step S402), the type determining unit 121 proceeds to Step S403.

At Step S403, the control unit 120 determines whether the mobile terminal 4 is located in the cell 3 of the base station 2 selected at Step S401. The determination is made depending on whether the located number of the base station 2 in the located information table 113 is "0", or on whether all the mobile terminals 4 correlated with the base station number of the base station 2 are "not located" by referring to the locatable terminal table 114.

In the process, if it is determined that the mobile terminal 4 is located in the cell 3 of the base station 2 (Yes at Step S403), or if it is determined that the base station 2 selected at Step S401 is not a small base station, at Step S402 (No at Step S402), the control unit 120 transmits a paging signal to the base station 2 (Step S404).

On finishing the process at Step S404, or if it is determined that no mobile terminal 4 is located in the cell 3 of the base station 2 selected at Step S401, at Step S403 (No at Step S403), the control unit 120 proceeds to Step S405.

At Step S405, the control unit 120 determines whether a series of processes at Steps S402 to S404 are performed for all the base stations 2 stored in the transmission information table 111 (Step S405). In the process, if it is determined that the series of processes are not performed for all the base stations 2 (No at Step S405), the control unit 120 proceeds to Step S401. If it is determined that the series of processes are performed for all the base stations 2 (Yes at Step S405), the control unit 120 proceeds to Step S400.

As described above, with the mobile communication system according to the fourth embodiment, it is possible to reduce the transmission load applied to the base station control apparatus 8 when the paging signal is transmitted.

It is also possible not to transmit a paging signal to the small base station in which the mobile terminal 4 is not located, among the small base stations. Accordingly, it is possible to prevent the base station control apparatus 8 from carrying unnecessary transmission load.

Figure 24:
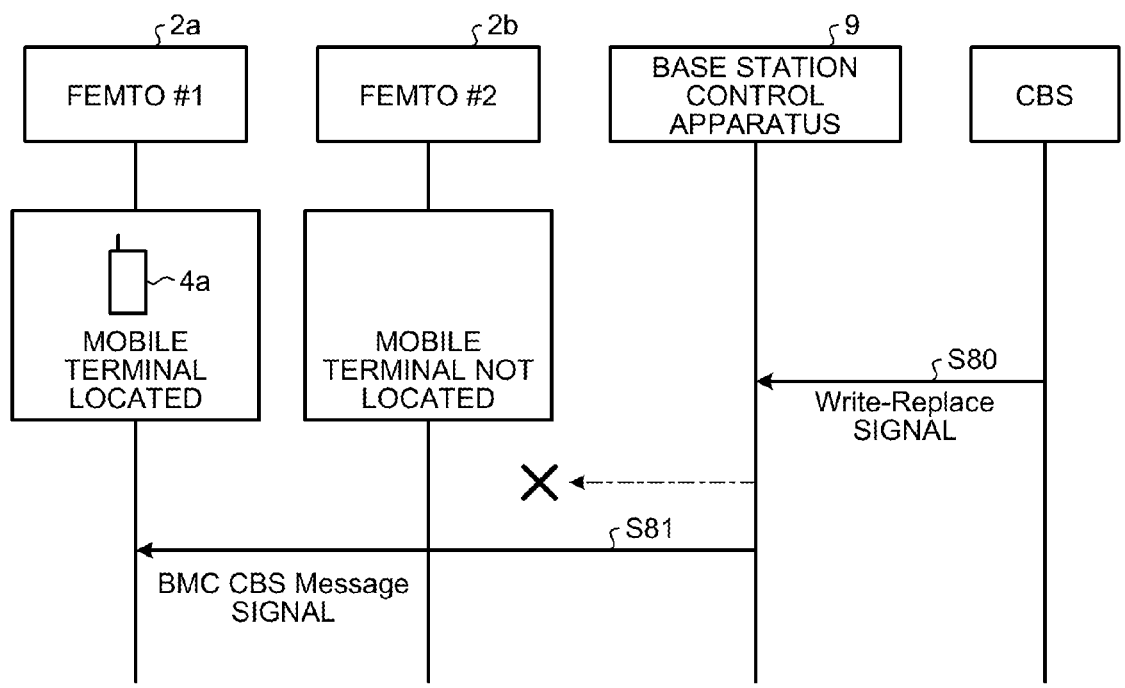
FIG. 24 is a schematic of a transmission method of a cell broadcast service (CBS) signal according to a fifth embodiment.

The predetermined signal may be a broadcast message signal. A mobile communication system according to a fifth embodiment will now be described with reference to FIG. 24. FIG. 24 is a schematic for explaining a transmission method of a paging signal performed by a base station control apparatus 9 according to the fifth embodiment. The same components as those already described are denoted by the same reference numerals, and the redundant descriptions thereof will be omitted.

In the present embodiment, an example of the broadcast message is a cell broadcast message. More specifically, the broadcast message is a broadcast multicast control (BMC) cell broadcast service (CBS) message signal. The BMC CBS message signal is a signal transmitted to the base stations by the base station control apparatus, based on a write-replace signal received from the cell broadcast center (CBC), which is the main network node of the core network.

As depicted in FIG. 24, the base station control apparatus 9 according to the present embodiment, on receiving a write-replace signal from the CBC, which is the main network node of the core network (Step S80), transmits a BMC CBS message signal to the base stations 2 (Step S81).

At this time, the base station control apparatus 9 does not transmits the BMC CBS message signal to the base station 2 in which the located number is "0" or all the mobile terminals that can be located are not located, by referring to the located information table 113 or the locatable terminal table 114. In other words, as depicted in FIG. 24, when the mobile terminal 4a is located in the "femto #1" but no mobile terminal 4 is located in the "femto #2", the base station control apparatus 9 transmits a BMC CBS message signal to the "femto #1", but does not transmit a BMC CBS message signal to the "femto #2".

"If the located number is 0" indicates the state when none of the mobile terminals 4 is located in the cell 3 of the base station 2. In such a state, for example, even if the BMC CBS message signal is not transmitted to the base station 2, none of the mobile terminals 4 will be affected. In this manner, even if the BMC CBS message signal is not transmitted when the located number in the base station is "0", it is possible to reduce the transmission load applied to the base station control apparatus 9, without affecting the communication environment of the mobile terminal 4.

Figure 25:
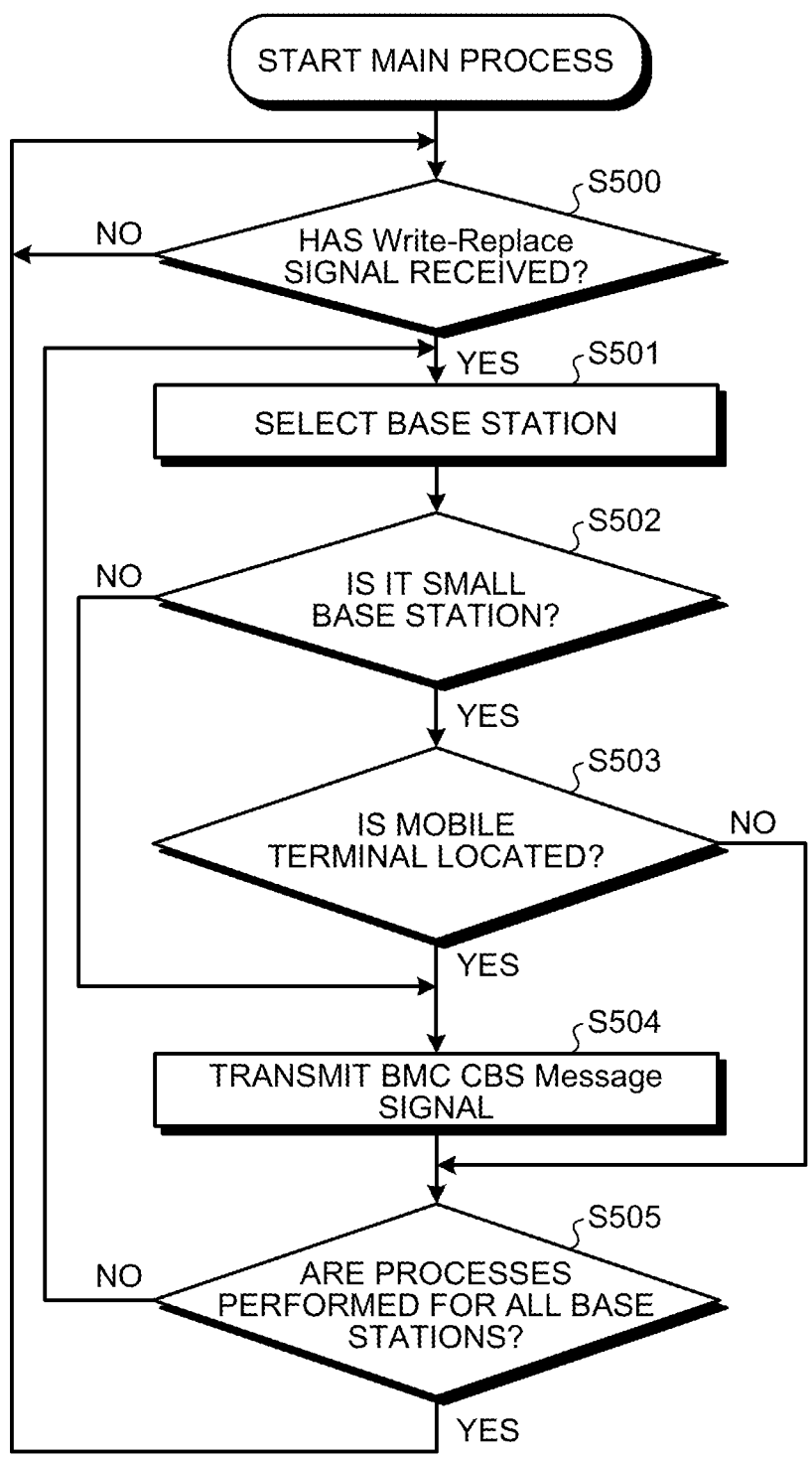
FIG. 25 is a flowchart of a procedure of a main process related to a transmission of the CBS signal performed by a base station control apparatus according to the fifth embodiment.

The main process related to the transmission of the BMC CBS message signal performed by the base station control apparatus 9 according to the fifth embodiment will now be described with reference to FIG. 25. FIG. 25 is a flowchart of a procedure of the main process related to the transmission of the BMC CBS message signal performed by the base station control apparatus 9 according to the fifth embodiment.

As depicted in FIG. 25, when the main process related to the transmission of the BMC CBS message signal is started, the communication processing unit 124 of the base station control apparatus 9 determines whether a write-replace signal is received from the CBC (Step S500). In the process, if it is determined that the write-replace signal is received from the CBC (Yes at Step S500), the communication processing unit 124 proceeds to Step S501.

At Step S501, the control unit 120 selects one base station 2 from the plurality of base stations stored in the transmission information table 111. The type determining unit 121 determines whether the type of the selected base station 2 is a small base station (Step S502). In the process, if it is determined that the type of the base station is a small base station (Yes at Step S502), the type determining unit 121 proceeds to Step S503.

At Step S503, the control unit 120 determines whether the mobile terminal 4 is located in the cell 3 of the base station 2 selected at Step S501. The determination is made depending on whether the located number of the base station 2 in the located information table 113 is "0", or on whether all the mobile terminals 4 correlated with the base station number of the base station 2 are "not located" by referring to the locatable terminal table 114.

In the process, if it is determined that the mobile terminal 4 is located in the cell 3 of the base station 2 (Yes at Step S503), or if the base station 2 selected at Step S501 is not a small base station (No at Step S502), the control unit 120 transmits a BMC CBS message signal to the base station 2 (Step S504).

On finishing the process at Step S504, or if no mobile terminal 4 is located in the cell 3 of the base station 2 selected at Step S501, at Step S503 (No at Step S503), the control unit 120 proceeds to Step S505.

At Step S505, the control unit 120 determines whether a series of processes at Steps S502 to S504 are performed for all the base stations 2 stored in the transmission information table 111 (Step S505). In the process, if it determined that the series of processes are not performed for all the base stations 2 (No at Step S505), the control unit 120 proceeds to Step S501. If it is determined that the series of processes are performed for all the base stations 2 (Yes at Step S505), the control unit 120 proceeds to Step S500.

As described above, with the mobile communication system according to the fifth embodiment, it is possible to reduce the transmission load applied to the base station control apparatus 9, when the BMC CBS message signal is transmitted.

It is also possible not to transmit a BMC CBS message signal to the small base station in which the mobile terminal 4 is not located, among the small base stations. Accordingly, it is possible to prevent the base station control apparatus 9 from carrying unnecessary transmission load.

While the embodiments disclosed above have been described in detail with reference to the drawings, these are merely examples, and in addition to the modes described above, the present invention can be carried out in other modes to which various modifications and variations are applied based on knowledge of those who are skilled in the art.

For example, in the first to third embodiments, the transmission period of a signal is determined based on the number of times that the timer has timed out. However, it is not limited thereto, and other embodiments may be used, if the transmission period of a signal can be determined for each base station.

In the first to third embodiments, the transmission interval setting value for the large base station is set to "1" and the transmission interval setting value for the small base station is set to "5". However, the values are appropriately changeable, as long as the transmission period of the signal to the large base station is within a range smaller than the transmission period of the signal to the small base station.

According to the mobile communication system, the signal transmission method thereof, and the transmitting node disclosed above, it is possible to advantageously transmit a predetermined signal without applying a large transmission load to the transmitting node, even if small base stations are installed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A mobile communication system comprising:
a plurality of base stations including a first base station covering a first range and a second base station covering a second range larger than the first range; and
a transmitting node that is connected to the base stations via a network and changes its own operation to the base station according to a type of the base station;
each of the base stations including:
a receiving unit that receives a predetermined signal transmitted from the transmitting node, and
the transmitting node including:
a type determining unit that determines whether the base station is the first base station or the second base station,
a transmission period setting unit that sets a transmission period of the predetermined signal for the base station determined to be the first base station, to be longer than a transmission period of the predetermined signal for the base station determined to be the second base station, the transmission period setting unit sets a different transmission period for each of more than one second base station irrespective of a number of mobile terminals in the range of the second base station, and a transmitting unit that transmits the predetermined signal to the base stations, based on a transmission period set for each of the base stations by the transmission period setting unit.

2. The mobile communication system according to claim 1, wherein the transmitting node includes a storage unit that stores therein located terminal number information that is information related to a number of mobile terminals located in a cell of the base station for each of the base stations, a receiving unit that receives predetermined information from the mobile terminal, and an information updating unit that updates the located terminal number information, based on the predetermined information received from the mobile terminal by the receiving unit, and wherein when the located terminal number information indicates that the number of the mobile terminals located in the cell of the base station corresponding to the located terminal number information is "0", the transmission period setting unit extends the transmission period of the predetermined signal for the base station, or sets so that the predetermined signal is not transmitted to the base station.

3. The mobile communication system according to claim 1, wherein the transmitting node includes a storage unit that stores therein locatable terminal information that is information related to an individual located state of all mobile terminals that are locatable in a cell of the base station for each of the base stations, a receiving unit that receives predetermined information from the mobile terminal, and p2 an information updating unit that updates the locatable terminal information, based on the predetermined information received from the mobile terminal by the receiving unit, and wherein when the locatable terminal information indicates that none of the mobile terminals that are locatable in the cell of the base station corresponding to the locatable terminal information is not located, the transmission period setting unit extends the transmission period of the predetermined signal for the base station, or sets so that the predetermined signal is not transmitted to the base station.

4. The mobile communication system according to claim 1, wherein the predetermined signal is either a health check signal, a reception notification signal, or a broadcast message signal.

5. A signal transmission method for transmitting a predetermined signal in a mobile communication system including a plurality of base stations including a first base station covering a first range and a second base station covering a second range larger than the first range, and a transmitting node that is connected to the base stations via a network and changes its own operation to the base station according to a type of the base station, the signal transmission method comprising:

in the transmitting node, determining whether the base station is the first base station or the second base station;

setting a transmission period of the predetermined signal for the base station determined to be the first base station, to be longer than a transmission period of the predetermined signal for the base station determined to be the second base station, the setting sets a different transmission period for each of more than one second base station irrespective of a number of mobile terminals in the range of the second base station; and transmitting the predetermined signal to the base stations, based on the transmission period set for each of the base stations; and in the base station, receiving the predetermined signal transmitted from the transmitting node.

6. The signal transmission method according to claim 5, wherein in the transmitting node, storing therein located terminal number information that is information related to a number of mobile terminals located in a cell of the base station for each of the base stations, receiving predetermined information from the mobile terminal, and updating the located terminal number information, based on the predetermined information received from the mobile terminal, and wherein when the located terminal number information indicates that the number of the mobile terminals located in the cell of the base station corresponding to the located terminal number information is "0", the transmission period of the predetermined signal for the base station is extended, or set so that the predetermined signal is not transmitted to the base station.

7. The signal transmission method according to claim 5, wherein in the transmitting node, storing therein locatable terminal information that is information related to an individual located state of all mobile terminals that are locatable in a cell of the base station for each of the base stations, receiving predetermined information from the mobile terminal, and updating the locatable terminal information, based on the predetermined information received from the mobile terminal, and wherein when the locatable terminal information indicates that none of the mobile terminals that are locatable in the cell of the base station corresponding to the locatable terminal information is located, the transmission period of the predetermined signal for the base station is extended, or set so that the predetermined signal is not transmitted to the base station.

8. A transmitting node comprising:

a transmitting unit that transmits a predetermined signal via a network to a plurality of base stations including a first base station covering a first range and a second base station covering a second range larger than the first range according to a type of each of the base stations;

a type determining unit that determines whether each of the base station is the first base station or the second base station; and a transmission period setting unit that sets a transmission period of the predetermined signal for the base station determined to be the first base station, to be longer than a transmission period of the predetermined signal for the base station determined to be the second base station, the transmission period setting unit sets a different transmission period for each of more than one second base station irrespective of a number of mobile terminals in the range of the second base station, and wherein the transmitting unit transmits the predetermined signal to the base stations, based on the transmission period set for each of the base stations by the transmission period setting unit.

9. The transmitting node according to claim 8, further comprising:

a storage unit that stores therein located terminal number information that is information related to a number of mobile terminals located in a cell of the base station for each of the base stations; and a receiving unit that receives predetermined information from the mobile terminal, and wherein when the located terminal number information indicates that the number of the mobile terminals located in the cell of the base station corresponding to the located terminal number information is "0", the transmission period setting unit extends the transmission period of the predetermined signal for the base station, or sets so that the predetermined signal is not transmitted to the base station.

10. The transmitting node according to claim 8, further comprising:

a storage unit that stores therein locatable terminal information that is information related to an individual located state of all mobile terminals that are locatable in a cell of the base station for each of the base stations;

a receiving unit that receives predetermined information from the mobile terminal; and an information updating unit that updates the locatable terminal information, based on the predetermined information received from the mobile terminal by the receiving unit, and wherein when the locatable terminal information indicates that none of the mobile terminals that are locatable in the cell of the base station corresponding to the locatable terminal information is located, the transmission period setting unit extends the transmission period of the predetermined signal for the base station, or sets so that the predetermined signal is not transmitted to the base station.

11. The transmitting node according to claim 8, wherein the predetermined signal is either a health check signal, a reception notification signal, or a broadcast message signal.

* * * * *